United States Patent
Kumahara et al.

(10) Patent No.: US 7,755,743 B2
(45) Date of Patent: Jul. 13, 2010

(54) SPATIAL INFORMATION DETECTING APPARATUS

(75) Inventors: Minoru Kumahara, Osaka (JP);
Yusuke Hashimoto, Neyagawa (JP);
Shinji Sakamoto, Takatsuki (JP); Yuji Takada, Kyoto (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 241 days.

(21) Appl. No.: 12/096,019

(22) PCT Filed: Oct. 10, 2007

(86) PCT No.: PCT/JP2007/069748

§ 371 (c)(1),
(2), (4) Date: Jun. 3, 2008

(87) PCT Pub. No.: WO2008/047640

PCT Pub. Date: Apr. 24, 2008

(65) Prior Publication Data

US 2009/0045359 A1 Feb. 19, 2009

(30) Foreign Application Priority Data

Oct. 18, 2006 (JP) .............................. 2006-284182
Jul. 31, 2007 (JP) .............................. 2007-199837

(51) Int. Cl.
*G01C 3/08* (2006.01)
(52) U.S. Cl. .................... 356/5.05; 356/4.07; 356/5.01; 356/5.07
(58) Field of Classification Search ................ 356/4.07, 356/5.01–5.15
See application file for complete search history.

(56) References Cited

U.S. PATENT DOCUMENTS

| 4,025,193 | A | * | 5/1977 | Pond et al. ................... 356/5.1 |
| 4,768,877 | A | * | 9/1988 | Torregrosa et al. ......... 356/5.15 |
| 5,075,878 | A | * | 12/1991 | Ohtomo et al. ............. 702/176 |
| 5,856,667 | A | | 1/1999 | Spirig et al. |
| 5,940,170 | A | * | 8/1999 | Berg et al. ................... 356/5.1 |

(Continued)

FOREIGN PATENT DOCUMENTS

JP  01-169385 A  7/1989

(Continued)

OTHER PUBLICATIONS

International Search Report for the Application No. PCT/JP2007/069748 mailed Nov. 20, 2007.

*Primary Examiner*—Isam Alsomiri
(74) *Attorney, Agent, or Firm*—Cheng Law Group, PLLC

(57) ABSTRACT

In an apparatus using an intensity-modulated light for detection of spatial information based upon light intensity of light reflected from a target space, a timing synchronization circuit is provided to synchronize a phase of the intensity-modulated light from a light-emitting element with a timing of operating a light-receiving element receiving the intensity-modulated light. The light-receiving element is caused to operate for enabling the detection of intensity of the received light for each of a plurality of phase regions within one cycle of the intensity-modulated light. The timing synchronization circuit functions to compare a cyclic variation determining the operation of the light-receiving element with a cyclic variation associated with an output from a light-emitting element driving circuit in order to keep a constant phase difference between these two cyclic variations.

21 Claims, 17 Drawing Sheets

U.S. PATENT DOCUMENTS

| | | |
|---|---|---|
| 6,777,659 B1 | 8/2004 | Schwarte |
| 7,023,531 B2 * | 4/2006 | Gogolla et al. ............. 356/5.01 |
| 7,060,957 B2 | 6/2006 | Lange et al. |
| 7,119,350 B2 | 10/2006 | Hashimoto et al. |
| 7,138,646 B2 | 11/2006 | Hashimoto et al. |
| 7,388,655 B2 * | 6/2008 | Mori .......................... 356/5.1 |
| 2007/0057209 A1 | 3/2007 | Kurihara et al. |

FOREIGN PATENT DOCUMENTS

| | | |
|---|---|---|
| JP | 10-508736 A | 8/1998 |
| JP | 2002-516490 A | 6/2002 |
| JP | 2003-532122 A | 10/2003 |
| JP | 2004-032682 A | 1/2004 |
| JP | 2004-045304 A | 2/2004 |
| JP | 2006-084429 A | 3/2006 |

* cited by examiner

SPATIAL INFORMATION DETECTING APPARATUS

TECHNICAL FIELD

The present invention relates to a spatial information detection apparatus that uses intensity-modulated light for detecting spatial information such as a distance to an object located in a target space and reflectivity of the object based on a relationship between the intensity-modulated light directed to the target space and the intensity-modulated light reflected from the object.

BACKGROUND ART

Japanese Patent Application Laid-Open Publication No. 2004-45304 discloses a technique of measuring a distance to an object located in a target space by using intensity-modulated light. When using the intensity-modulated light of a sinusoidal waveform, the light reflected from the object is also of a sinusoidal waveform with a phase difference that varies with a distance to the object. Thus, the distance to the object in the illuminated target space can be measured based upon the phase difference between the emitted and reflected intensity-modulated lights.

Based upon an intensity measurement of the received intensity-modulated light for each of a plurality of phase ranges, the phase difference can be derived from a relation between the location of the phase range and the received light intensity. For instance, the received light intensity lr can be expressed to be $lr=\eta \cdot l(t-d)+le$, wherein $l(t)$ denotes the directed light intensity as a function of time t, $\eta$ is a light attenuation factor due to a distance to the object or reflectance thereat, le is an intensity of environmental (disturbance) illumination, and d is a delay time corresponding to the distance L to the object and is expressed by $d=2L/c$.

The above expression has three unknowns of the attenuation factor $\eta$, the delay time d, and the environment illumination intensity le, which can be obtained through measurements of received light intensities respectively at three or more different times. Thus, it is possible to obtain the distance to and reflectance of the object as the spatial information. Since the intensity-modulated light is generally designed to cyclically vary its intensity, the integration of the received light intensities over a plurality of periods of cycle can restrain influence of fluctuation in the environmental illumination or noise developed in the device.

In order to detect the spatial information with the above technique, it is necessary to precisely interrelate the phase ranges of the intensity-modulated light directed to the target space with those of the received light. There are general techniques for extracting electric charges from the light-receiving element at a specific one of phase ranges, one sending a signal designating the specific phase regions for extraction of the electric charges from the light-receiving element with a control electrode provided for control of the timing of extracting the charges (as in the light-receiving element made of CCD or the like), and the other selecting only the electric charges extracted in the period corresponding to the specified phase region (as in the light-receiving element made of photodiode or the like). In order to improve accuracy of the measurements, either of the above techniques necessitates to precisely synchronize the signals one given to the light-emitting element with the other given to the light-receiving element for the electric charge extraction.

However, the light-emitting element, the light-receiving element, as well as circuits for generating the signals associated with these elements may suffer from variations in their characteristics depending upon varying ambient temperature and humidity. Thus, there is always a likelihood of exaggerating an error in the measurement results due to the environmental changes even operating the device after calibration thereof.

DISCLOSURE OF THE INVENTION

In view of the above problems, the present invention has been achieved and has an object of providing a spatial information detection apparatus which utilizes an intensity-modulated light and is arranged to reduce detection errors due to variations of the surrounding environment for assuring accurate measurement.

The spatial information detection apparatus in accordance with the present invention includes a light-emitting element 100 emitting an intensity-modulated light to a target space, a light-receiving element 200 receiving the intensity-modulated light reflected from an object in the target space, and an information output circuit 300 which is configured to extract a light intensity of the light received at the light-receiving element for each of a plurality of phase ranges P0, P1, P2, and P3, to determine, based upon the extracted light intensities, a relation between the intensity-modulated lights one emitted from the light-emitting element and the other received at the light-receiving element, and to output spatial information within the target space.

In order to generate the intensity-modulated light from the light-emitting element, the spatial information detection apparatus includes a lighting signal generation circuit 10 configured to generate a lighting timing signal which determines a lighting timing of the light-emitting element, and a light-emitting element driving circuit 30 configured to output a light-emitting element driving signal, in response to the lighting timing signal, for generation of the intensity-modulated light from the light-emitting element.

Further, in order to operate the light-receiving element for receiving the light at each of the phase regions, the apparatus includes a light-receiving element driving circuit 40 configured to output a plurality of light-receiving element driving signal which are out of phase relation from each other to the light-receiving element, and a detection signal generation circuit 20 configured to provide a detection timing signal to the light-receiving element driving circuit, the detection timing signal determining a timing of generating the light-receiving element driving signal. The spatial information detection apparatus of the present invention is characterized to have a timing synchronization circuit 70; 70A; and 70B which is configured to compare a cyclic variation E2 associated with the output from the light-emitting element driving circuit with a cyclic variation D1; D2 determined by the detection timing signal, and modify at least one of the detection timing signal and the lighting timing signal in order to keep a constant phase difference between these cyclic variations.

With this arrangement, it is possible to synchronize the phase of the intensity-modulated light from the light-emitting element with the timing of receiving the intensity-modulated light at the light-receiving element, thereby coinciding the operation timings at the elements even in the presence of response variations possible in components of the light-emitting element and the light-receiving element driving circuit due to the surrounding environmental changes, and therefore giving accurate measurements free from being influenced from the surrounding environmental changes.

Preferably, the timing synchronization circuit is configured to obtain a cyclic variation of the light-receiving element driving signal D2 from the light-receiving element driving circuit 40 as the cyclic variation to be determined by the detection timing signal for comparison with the light-emitting element driving signal E2 from the light-emitting element driving circuit.

It is also preferred that the timing synchronization circuit 70 is configured to modify the lighting timing signal into a modified lighting timing signal and feed the modified lighting timing signal to the light-emitting element driving circuit. With this configuration, it is enabled to adjust the phase of the intensity-modulated light from the light-emitting element in match with the timing of receiving the intensity-modulated light at the light-receiving element, thereby coinciding the operation timings on the sides of the light emitting and receiving elements. In this case, synchronization of the operation timings can be made between the light emitting and receiving elements only by the modification of the lighting timing signal determining the cyclic variation of the intensity-modulated light from the light-emitting element, which enables to simplify a circuit arrangement of the timing synchronization circuit.

In this connection, it is also preferred that the timing synchronization circuit 70 is interposed between the lighting signal generation circuit 10 and the light-emitting element driving circuit 30, and includes a phase adjusting circuit 76 configured to shift a phase of the lighting timing signal output from the lighting signal generation circuit to the light-emitting element driving circuit 30 by a variable phase shift value, and a phase comparator 72 configured to determine the phase shift value in accordance with a phase difference between the cyclic variation from the light-receiving element driving circuit and the light-emitting element driving signal E2 from the light-emitting element driving circuit.

Preferably, the light-receiving element driving circuit 40 is configured to determine the light-receiving element driving signals based upon a plurality of detection timing signals D1 output from the detection signal generation circuit 20, and includes a selector 80 configured to selectively extract one of a plurality the light-receiving element driving signals D2 which are out of phase relation from each other. In this instance, the timing synchronization circuit 70 is configured to modify the lighting timing signal based upon a phase difference between the each of the light-receiving element driving signals D2 extracted by the selector 80 and the cyclic variation E2 associated with the output from the light-emitting element driving circuit 30. Thus, the lighting timing signal can be adjusted within the period of one cycle based upon the light-receiving element driving signals each determining the phase ranges P0, P1, P2, and P3.

The information output circuit 300 is preferably configured to integrate the received light intensities over a plurality of times for each of the phase ranges respectively corresponding to the light-receiving element driving signals for obtaining the spatial information based upon the individual integrated values respectively for the phase ranges. In this connection, the information output circuit is configured to extract the received light intensity from the light-receiving element for each of the phase ranges in synchronous with the light-receiving element driving signals extracted from the selector. With this arrangement, it is possible to accurately obtain the intensity of the intensity-modulated light received at the light-receiving element to improve detection accuracy of the spatial information.

Further, the spatial information detection apparatus of the present invention may include a supplemental phase adjusting circuit 90 interposed between the detection signal generation circuit 20 and the light-receiving element driving circuit 40 so as to shift the phase of the detection timing signal D1 output to the light-receiving element driving circuit 40 by a variable shift phase value, and a supplemental phase comparator 92 configured to detect a phase difference between the detection timing signal D1 and the cyclic variation D2 of the output from the light receiving driving circuit 40 so as to provide an output indicative of the phase difference to the supplemental phase adjusting circuit 90. With this arrangement, the supplemental phase adjusting circuit can determine the phase shift value based upon the phase difference so as to keep a predetermine value for the phase difference between the detection timing signal and the light-receiving element driving signal from the light-receiving element driving circuit, thereby enabling to keep the phase difference between the light-emitting element driving signal and the light-receiving element driving signal at a constant for improving the detection accuracy of the spatial information.

The timing synchronization circuit 70; 70A may be configured to compare the cyclic variation E2 associated with the output from the light-emitting element driving circuit 30 with the detection timing signal D1 from the detection signal generation circuit 20.

In this instance, the timing synchronization circuit 70 may be configured to modify the lighting timing signal based upon the above comparison and provide the modified lighting timing signal E1x to the light-emitting element driving circuit 30.

Alternatively, the timing synchronization circuit 70A may be configured to modify, based upon the above comparison, the detection timing signal into a modified detection timing signal (D1x) and provide the modified detection timing signal to the light-receiving element driving circuit 40.

In the latter instance, the timing synchronization circuit 70A is preferably interposed between the detection signal generation circuit 20 and the light-receiving element driving circuit 40, and includes a phase adjusting circuit 76A configured to shift a phase of the detection timing signal D1 output from the detection signal generation circuit to the light-receiving element driving circuit by a variable phase shift value, and a phase comparator 72A configured to determine the phase shift value in accordance with a phase difference between the cyclic variation from the light-emitting element driving circuit and the detecting timing signal from the detection signal generation circuit. With this arrangement, it is enabled to modify the timing of driving the light-receiving element in accordance with the intensity-modulated light from the light-emitting element such that the intensity-modulated light can be received at the light-receiving element at an exact coincidence with the intensity-modulated light emitted from the light-emitting element.

Further, the spatial information detection apparatus of the present invention can be arranged to give a timing adjusting function to both of the light emitting and receiving sides. In this instance, the timing synchronization circuit is composed of a first timing synchronization circuit interposed between the lighting signal generation circuit and the light-emitting element driving circuit, and a second timing synchronization circuit interposed between the detection signal generation circuit and the light-receiving element driving circuit.

The first timing synchronization 70 circuit is composed of a first phase adjusting circuit 76 configured to shift a phase, by a variable phase shift value, of the lighting timing signal E1 output from the lighting signal generation circuit 10 to the light-emitting element driving circuit 30, and a first phase comparator 72 configured to determine the phase shift value based upon a phase difference between the cyclic variation E2 output from the light-emitting element driving circuit 30 and the detection timing signal D1 from the detection signal generation circuit 20. Similarly, the second timing synchronization circuit 70A is composed of a second phase adjusting circuit 76A configured to shift a phase, by a variable phase shift value, of the detection timing signal D1 output from the detection signal generation circuit 20, and a second phase comparator 72A configured to determine the phase shift value based upon a phase difference between the lighting timing signal E1 from the lighting signal generation circuit 10 and the light-receiving element driving signal D2 from the light-receiving element driving circuit 40. Thus, more complementary timing adjustment can be made accurately on both side of the light emitting and receiving sides.

When making the timing adjustment on the light receiving side, it is desired to keep a constant phase difference between the modified detection timing signal from the timing synchronization circuit and the light-receiving element driving signal from the light-receiving element driving circuit in consideration of an input-output delay possible in the light-receiving element driving circuit itself due to the influence of the ambient temperature. In this instance, the spatial information detection apparatus of the present invention may include a supplemental phase adjusting circuit 90A configured to shift, by a variable phase shift value, the modified detection timing signal output to the light-receiving element driving circuit, and a supplemental phase comparator 92A configured to detect a phase difference between the modified lighting timing signal and the light-receiving element driving signal D2 from the light-receiving element driving circuit 40, and provide a corresponding output to the supplemental phase adjusting circuit. The supplemental phase adjusting circuit 90A determines the phase shift value based upon the detected phase difference so as to keep a predetermined value for the phase difference between the modified detection timing signal D1$x$ from the timing synchronization circuit 70A and the light-receiving element driving signal D2 from the light-receiving element driving circuit 40. Whereby, it is possible to modify the timing of driving the light-receiving element in phase with the intensity-modulated light from the light-emitting element.

In addition, a reference light-receiving element 110 may be provided to receive a portion of the intensity-modulated light from the light-emitting element in order to read out the cyclic variation associated with the output from the light-emitting element driving circuit.

The timing synchronization circuit 70B on the light receiving side may be configured to include an oscillation circuit 78 configured to use a signal of which frequency varies with an input voltage and provide the signal as the modified detection timing signal to the light-receiving element driving circuit, and a phase comparator 72B configured to generate a voltage indicative of a phase difference between the cyclic variation E2 associated with the output from the light-emitting element driving circuit and the detection timing signal D1 from the detection signal generation circuit 20, and provide the voltage to the oscillation circuit. In this instance, the oscillation circuit can be utilized to modify the detection timing signal being fed to the light-receiving element driving circuit for the purpose of adjusting the timing of operating the light-receiving element in phase with the intensity-modulated light from the light-emitting element.

The light-receiving element may be an element such as a CCD image capturing element having a capacitive reactance and operating on a DC current supplied from a DC power source. The capacitive reactance is likely to be influenced by an ambient temperature which may cause a varying time delay from a planned start time designated by the detection timing signal D1 input to the light-receiving element driving circuit 40 to an actual start time at which the light-receiving element 200 makes an intended operation in response to the light-receiving element driving signal D2 generated from the light-receiving element driving circuit 40. The present invention proposes the light-receiving element driving circuit having an effective configuration for eliminating such uncertain time delay to enable more accurate detection of the spatial information. The light-receiving element driving circuit 40B includes an output switch 50 connected between the DC power source and the light-receiving element to supply the DC current to the light-receiving element in synchronous with the detection timing signal, a temperature sensor 150 for detection of an ambient temperature, and a current controller 160 which regulates the current being fed to the light-receiving element in such a manner as to keep the current at a predetermined varying rate. With this arrangement, it is possible to adjust the time delay from the reception time of the detection timing signal to a time at which the light-receiving element is given a current sufficient to fully operate, thereby keeping the time delay at a constant between the occurrence of the detection timing signal and the actual start time of operating the light-receiving element for synchronizing the actual start time substantially with the occurrence of the detection timing signal.

The current controller 160 may include a memory means 162 which stores the varying rate of the current flowing the light-receiving element in association with the temperature, and be configured to read out the current varying rate from the memory means in correspondence to the temperature output from the temperature sensor so as to control the current through the light-receiving element in match with the reading of the current varying rate.

Instead of using the control based upon the ambient temperature, it is equally possible to control the output current to the light-receiving element based upon a varying rate of the current flowing through the light-receiving element. In this instance, the light-receiving element driving circuit 40; 40A is composed of a current monitoring circuit 60 which monitors the varying rate of the current being fed to the light-receiving element and provides a current variation output indicative of the varying rate, and a current controller 66 which regulates the current being fed to the light-receiving element in response to the current variation output for keeping the current varying rate at a predetermined value. Thus, the current is kept supplied to the light-receiving element at a constant varying rate, enabling to operate the light-receiving element after an elapse of a constant time from receiving the detection timing signal, without being influenced by the environmental changes.

Preferably, the current monitoring circuit 60 is composed of a differential circuit 62 which calculates an instant varying rate of the current flowing through the light-receiving element, and a peak detection circuit 64 which detects a maximum of the instant varying rate derived from the differential circuit. In this connection, the current controller is configured to control the current flowing through the light-receiving element at a predetermined varying rate in accordance with the maximum of the instant varying rate. This arrangement assures to stably control the operation time of the light-receiving element.

Further, the light-receiving element driving circuit 40A may be configured to allow the function of controlling the output current to the light-receiving element based upon the current flowing therethrough only at a predetermined temperature condition. In this instance, the light-receiving element driving circuit 40A is composed of a temperature sensor 130 for detection of the ambient temperature, a register 68 which holds a maximum of the instant varying rate detected at the peak detection circuit 64, a temperature table 140 which stores the output of the temperature sensor at a predetermined interval, and an activation circuit 120 which activates the differential circuit 62 and the peak detection circuit 64 only when there is detected a temperature difference exceeding a predetermined level between a current temperature and a past temperature recorded at a predetermined past time. Thus, the differential circuit and the peak detection circuit can be kept deactivated within a temperature range that does give an adverse effect on the operation of the light-receiving element for reducing power consumption.

The present invention may use the timing synchronization circuit 70 which is configured to compare the cyclic variation of the lighting timing signal from the lighting signal generation circuit with the cyclic variation determined by the detection timing signal. In this instance, the timing synchronization circuit can be composed of an oscillation circuit 78 which uses a signal of which frequency varies with an input voltage and provide the signal as the modified lighting timing signal to the light-emitting element driving circuit, and a phase comparator 72 which generates a voltage indicative of a phase difference between the cyclic variation associated with the output from the light-receiving element driving circuit and the lighting timing signal from the lighting signal generation circuit.

BEST MODE FOR CARRYING OUT THE INVENTION

1st Embodiment

Figure 1:
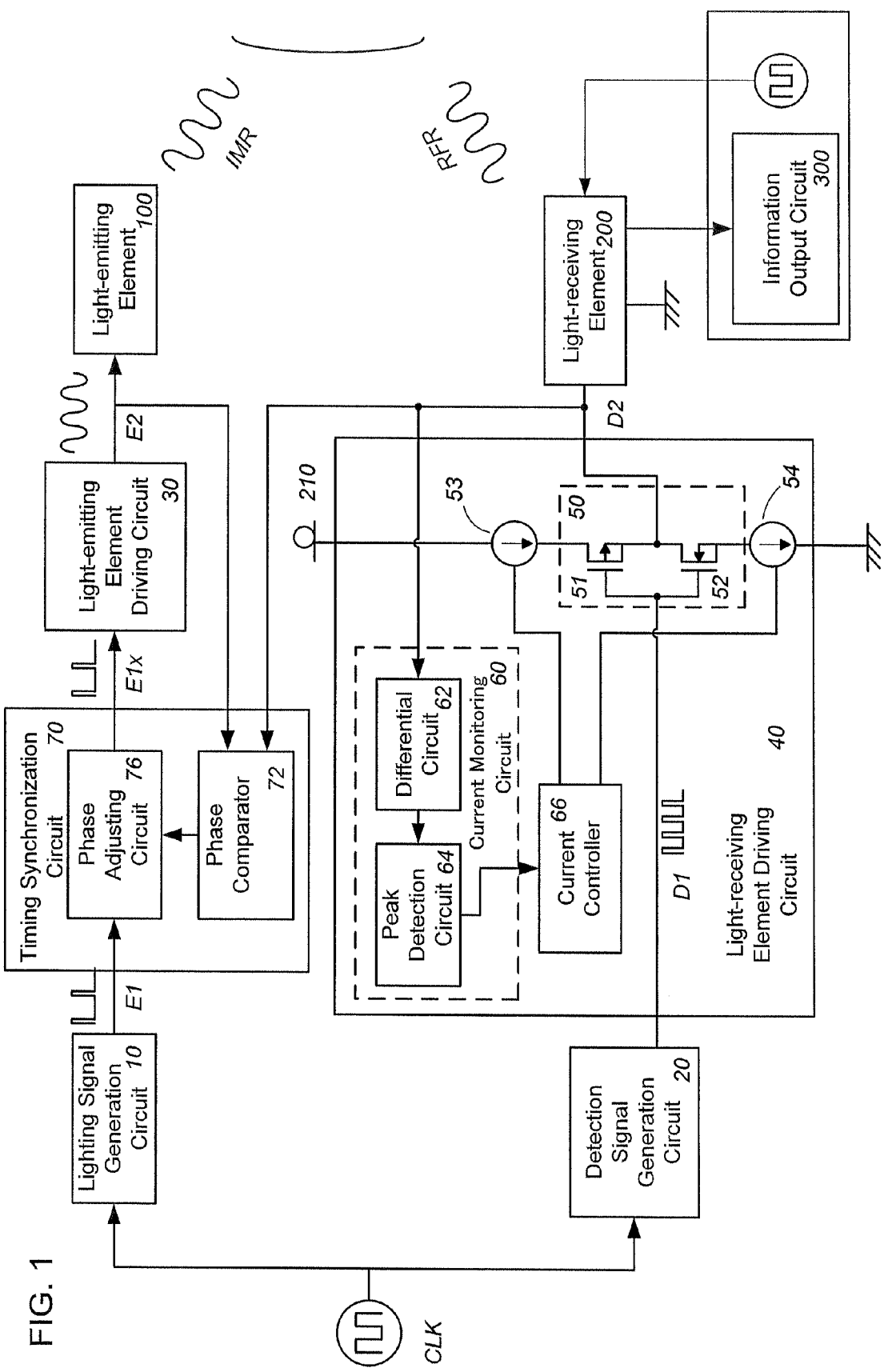
FIG. 1 is a block diagram illustrating a spatial information detection apparatus according to a first embodiment of the present invention.

Referring to FIGS. 1 to 4, an explanation is made to a spatial information detection apparatus in accordance with a first embodiment of the present invention. The spatial information detection apparatus includes a light-emitting element 100 configured to emit an intensity-modulated light to a target space, a light-receiving element 200 configured to receive the intensity-modulated light reflected from an object in the target space, and an information output circuit 300 which is configured to extract a light intensity of the light received at the light-receiving element for each of a plurality of phase ranges to determine, based upon the extracted light intensities, a relation between the intensity-modulated lights one emitted from the light-emitting element and the other received at the light-receiving element, and to output spatial information within the target space.

The light-emitting element 100 is made of a LED of which intensity is modulated at a frequency of 100 Hz to 1 GHz to provide the intensity-modulated light of sinusoidal waveform. The light-receiving element 200 is realized by a CCD image sensing element in order to receive the intensity-modulated light reflected from the object in the target space, and is disposed adjacent to the light-emitting element 100 so as to receive the intensity-modulated light emitted from the light-emitting element 100 and reflected at the object while travelling an optical path twice a distance T from the light-emitting element to the object. The light-emitting element 100 is not necessarily limited to the LED and may include another light source. Also, the light receiving element 200 is not limited to the CCD, and may include a CMOS image sensing element or the like light-receiving element.

The light-emitting element 100 and the light-receiving element 200 are configured to operate respectively on a lighting timing signal E1 output from a lighting signal generation circuit 10 and a detection timing signal output from a detection signal generation circuit 20. The lighting signal generation circuit 10 and the detection signal generation circuit 20 operate on a common clock CLK generated in a timing generation circuit (not shown).

Figure 3:
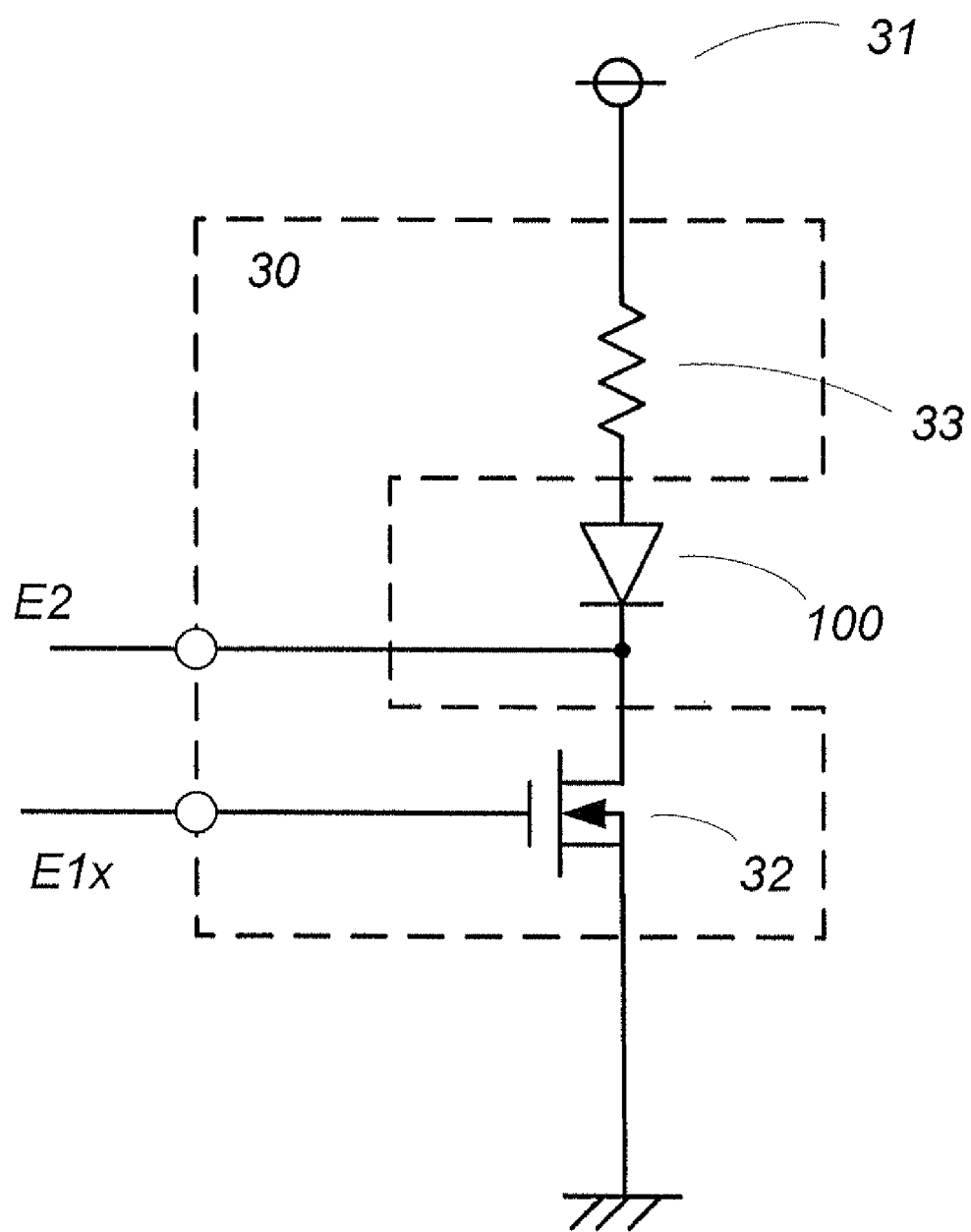
FIG. 3 is a circuit diagram illustrating a driving circuit for a light-emitting element utilized in the above apparatus.
Figure 4:
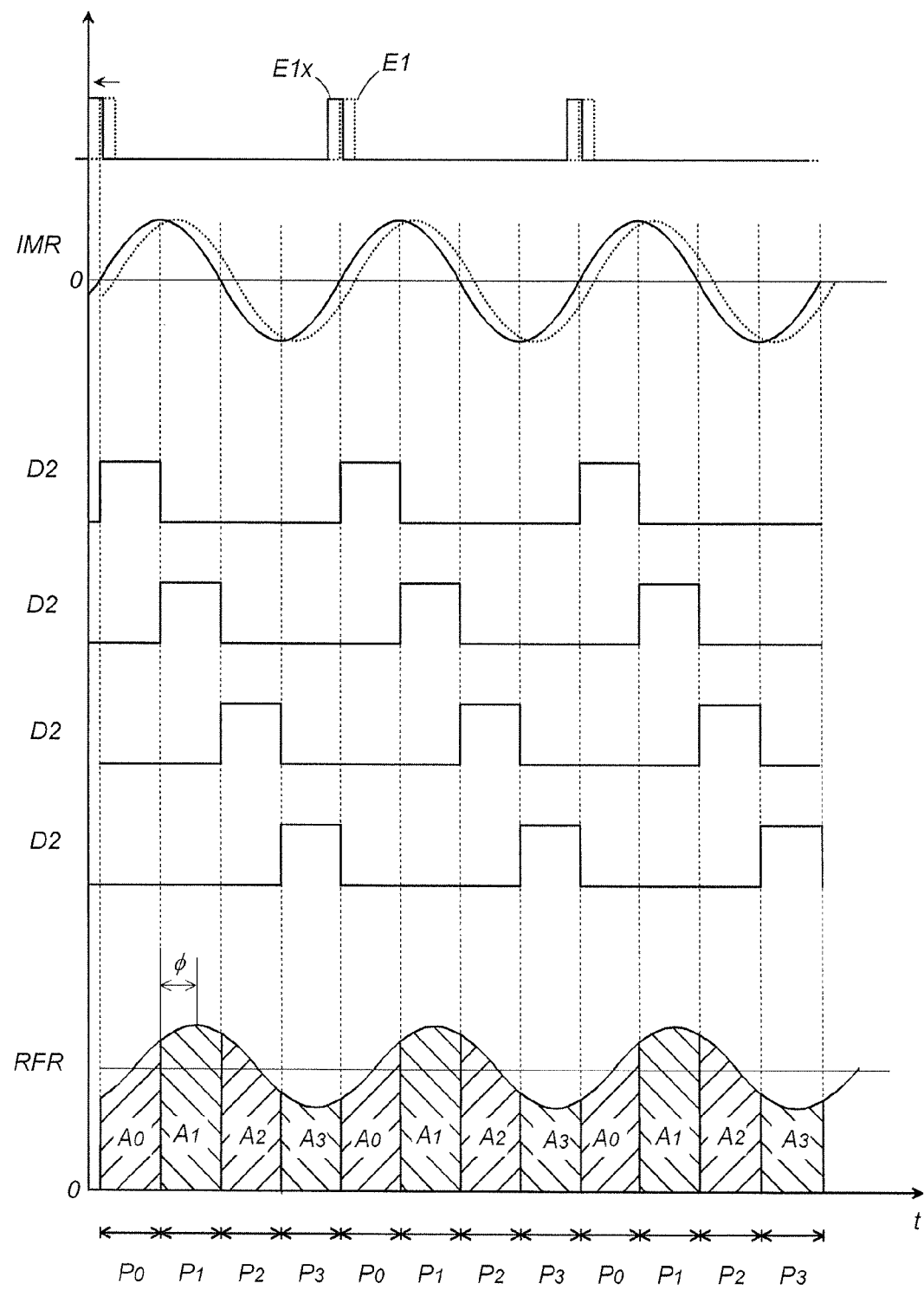
FIG. 4 illustrates a waveform chart explaining a timing adjusting operation of the above apparatus.

The lighting signal generation circuit 10 is connected to a light-emitting element driving circuit 30 through a timing synchronization circuit 70 described hereinafter, so that the lighting timing signal E1 is modified at the timing synchronization circuit 70 into a modified timing signal E1$x$ and is then fed to the light-emitting element driving circuit 30. Based upon the modified timing signal E1$x$, the light-emitting element driving circuit 30 generates a light-emitting element driving signal E2 which drives the light-emitting element 100 to generate the intensity-modulated light. As shown in FIG. 3, the light-emitting element driving circuit 30 includes FET 32 and a resistor 33 connected in series with the light-emitting element 100 between a DC power source 31 and the ground, and is configured to turn on and off FET 32 at the above frequency in response to the modified timing signal E1$x$ of rectangular waveform. That is, the light-emitting element is turned on at the rising edge of the modified lighting timing signal E1x and is turned off at the falling edge thereof. The light-emitting element 100 is thus turned on and off at the frequency to issue a light of which intensity varies sinusoidally, as shown in FIG. 4, thereby generating the intensity-modulated light IMR of sinusoidal waveform. The details of the timing synchronization circuit 70 will be discussed later.

The detection signal generation circuit 20 is connected to a light-receiving element driving circuit 40 which generates a light-receiving element driving signal D2 based upon the detection timing signal to drive the light-receiving element 200 at a predetermined frequency. The light-receiving element 200 realized by the CCD image sensing element has a capacitive reactance, and comes into a condition of accumulating the electric charges in proportion to the intensity of the intensity-modulated light reflected from the object upon being charged up to a predetermined level by the light-receiving element driving signal D2. By repeating the charging and discharging within one cycle period of the intensity-modulated light, the light-receiving element is given a plurality of phase ranges P0, P1, P2, and P3 within the one cycle period, as shown in FIG. 4. The electric charges accumulated for each of the phase ranges, i.e., the received light intensity is read by the information output circuit 300 which determines the waveform of the received intensity-modulated light, calculates a phase difference f between the intensity-modulated lights directed from the light-emitting element 100 and received at the light-receiving element 200 based upon the waveform, and obtains the distance to the light reflecting object based upon the phase difference f.

Referring to FIG. 4, an explanation is made for a scheme of calculating the phase difference f. The phase ranges P0, P1, P2, and P3 determined by the light-receiving element driving signal D2 are set respectively to be 0° to 90°, 90° to 180°, 180° to 270°, and 270° to 360° of the phase of the intensity-modulated light IMR from the light-emitting element 100. Assuming that the light-receiving element 200 receives the reflected light RFR from the object within the target space into which the intensity-modulated light is directed, to have the received light amount of A0, A1, A2, and A3 respectively at the phase ranges, the relation of $\phi=\tan^{-1}(A3-A1)/(A0-A2)$ is established between the phase difference f and the received light amounts A0, A1, A2, and A3. The calculation is executed at the information output circuit 300 which in turn calculates the distance L to the object with reference to thus obtained phase difference $\phi$, the frequency f of the intensity-modulated light, and the light velocity c ($L=\phi \cdot c/2f$).

As is understood from the above, the accurately obtained phase difference $\phi$ is essential for measurement of the distance to the object. To this end, it is necessary to determine the received light intensity at an exact timing synchronized with the waveform of the intensity-modulated light IMR. However, in view of that there may be a situation where the intensity-modulated light from the light-emitting element 100 does not coincide exactly with the lighting timing signal E1 due to the varying ambient temperature, it becomes important to modify the lighting timing signal E1 based upon the actual waveform of the intensity-modulated light and the light-receiving element driving signal D2. For instance, as the ambient temperature lowers, the phase of light-emitting element driving signal E2 defined by the current flowing through the light-emitting element 100 will delay relative to the lighting timing signal E1, causing a phase lag of the intensity-modulated light IMR relative to the lighting timing signal E1, as indicated by dotted lines in FIG. 4.

In view of the above, the present embodiment is configured to interpose the timing synchronization circuit 70 between the lighting signal generation circuit 10 and the light-emitting element driving circuit 30 so as to modify the phase of the lighting timing signal E1 for keeping a phase difference between the light-emitting element driving signal E2 and the light-receiving element driving signal D2 at zero or a predetermined constant value, and prepare the light-emitting element driving signal E2 based upon the modified lighting timing signal E1x. In response to thus prepared light-emitting element driving signal E2, the light-emitting element 100 generates the intensity-modulated light IMR in synchronous with the phase of the light-receiving element driving signal D2, as shown by solid lines in FIG. 4. With this result, the individual phase ranges P0, P1, P2, and P3 determined by the light-receiving element driving signals D2 can be exactly synchronized with the intensity-modulated light IMR from the light-emitting element 100, enabling to obtain the accurate phase difference f between the intensity-modulated light IMR from the light-emitting element 100 and the reflected light RFR at the light-receiving element 200, and to calculate the exact distance to the object based upon the phase difference.

Figure 2:
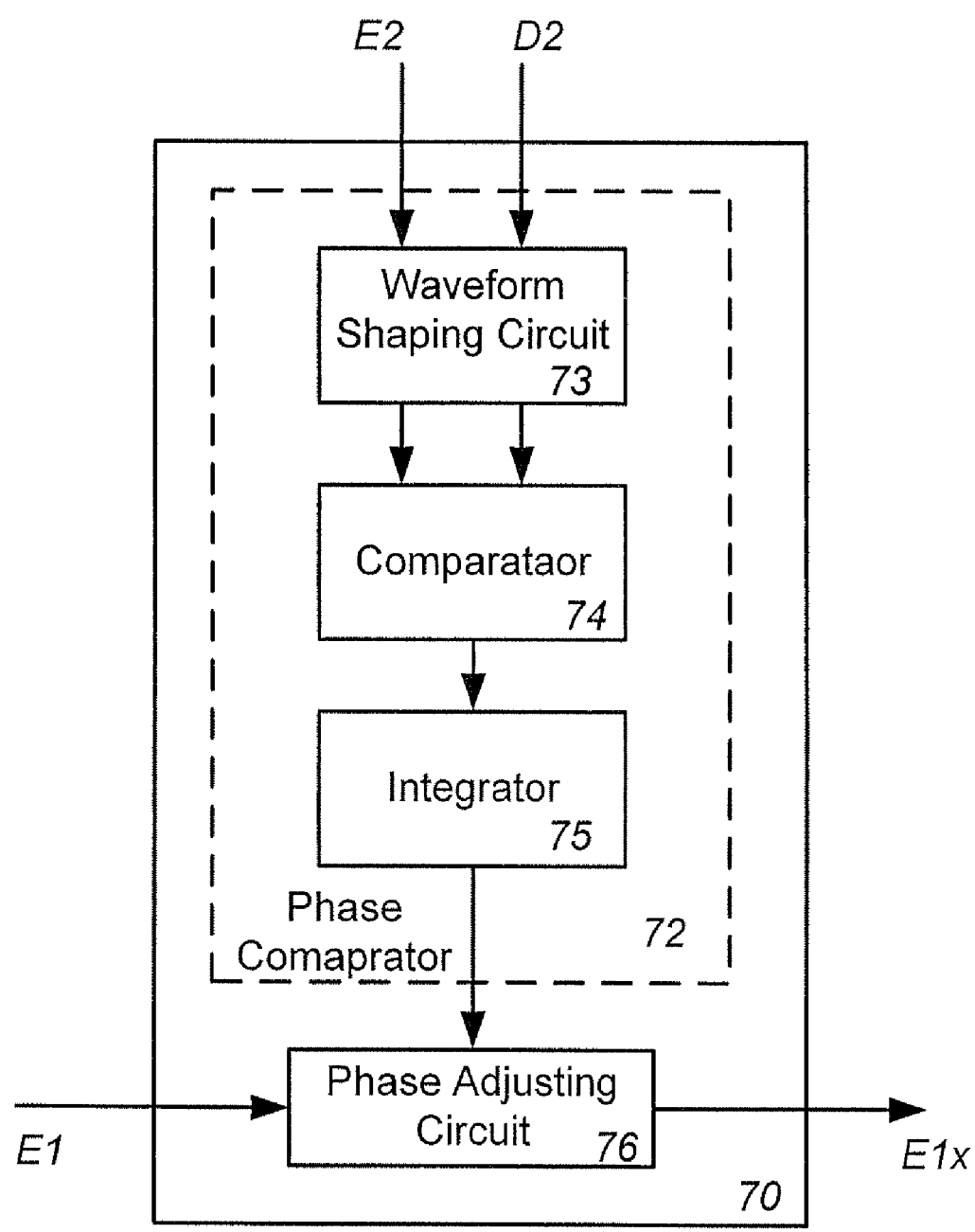
FIG. 2 is a block diagram illustrating an internal structure of a phase comparator used in the above apparatus.

As shown in FIG. 1, the timing synchronization circuit 70 includes a phase comparator 72 configured to a phase difference between the light-emitting element driving signal E2 and the light-receiving element driving signal D2, and a phase adjusting circuit 76 configured to determine a phase shift value of the lighting timing signal E1 depending upon the phase difference output from the phase comparator 72. As shown in FIG. 2, the phase adjusting circuit 76 is composed of a waveform shaping circuit 73 configured to shape the light-emitting element driving signal E2 and the light-receiving element driving signal D2 respectively into rectangular waveforms, and a comparator 74 for comparing the wave-shaped signals, and an integrator 75 configured to integrate the output of the comparator 74 to give the phase shift value corresponding to the phase difference between the driving signals.

The light-receiving element driving circuit 40 includes an output switch 50 which is turned on and off in response to the detection timing signal D1 to supply a current from a DC power source 210 to the light-receiving element 200 so as to actuate the light-receiving element 200 at a timing determined by the detection timing signal D1. That is, the driving circuit 40 is configured such that the light-receiving element 200 is activated by the current from the DC power source 210 to come into an operable condition for detection of the reflected light intensity. However, since the light-receiving element 200 has a capacitive reactance, there may occur a situation where the current being fed to the light-receiving element 200, i.e., a current varying rate of the light-receiving element driving signal D2 varies in response to a considerably varying ambient temperature, causing a delay in activating the light-receiving element 200 relative to the detection timing signal D1. For instance, upon seeing a considerable drop in the ambient temperature, the light-receiving element driving signal D2, i.e. the driving current rises slowly, thereby activating the light-receiving element 200 with a delay relative to the detection timing signal D1.

In order to eliminate the above problem, the light-receiving element driving circuit 40 of the present embodiment is configured to include a current monitoring circuit 60 which monitors the current varying rate of the current defined by the light-receiving element driving signal D2 and a current controller 66 which regulates, based upon the output of the current monitoring circuit 60, the current varying rate of the output current supplied from the DC power source 210 through the output switch 50 to the light-receiving element 200, i.e., the rising time of the current reaching a level for truly activating the light-receiving element 200 as well as the falling time of the current dropping to a level for deactivating the light-receiving element 200. The output switch 50 includes a n-type MOSFET 51 and a p-type MOSFET 52 which are connected in series between the DC power source 210 and the ground with the light-receiving element 200 connected between the node of the FETs and the ground. The detection timing signal D1 is input to the gates of the FETs so as to turn on FET 51 and therefore supply the current from the DC power source 210 to the light-receiving element 200 for charging the same when the detection timing signal D1 is on, and turn on FET 52 for discharging the light-receiving element when the detection timing signal D1 is off. A resistor 53 is interposed between the DC power source 210 and FET 51 for restricting the current being fed to the light-receiving element 200, while a resistor 54 is interposed between FET 52 and the ground for restricting the discharging current from the light-receiving element.

The current monitoring circuit 60 includes a differential circuit 62 which detects an instant varying rate of the light-receiving element driving signal D2, i.e., the current flowing through the light-receiving element 200, and a peak detection circuit 64 which detects a maximum of the instant varying rate. The current controller 66 is configured to control the resistors 53 and 54 for keeping the varying rate of the current through the light-receiving element 200 at a predetermined value in accordance with the maximum of the varying rate output from the peak detection circuit 64. Whereby, it is possible to give a constant activation time for activating the light-receiving element 200 and a constant deactivation time for deactivating the element after reception of the detection timing signal D1, without being influenced by the ambient temperature, thereby improving detecting accuracy of the spatial information.

Each of the resistors 53 and 54 is made of MOSFET which varies its on-resistance continuously in response to the gate voltage of MOSFET being varied by the output from the current controller 66.

Figure 5:
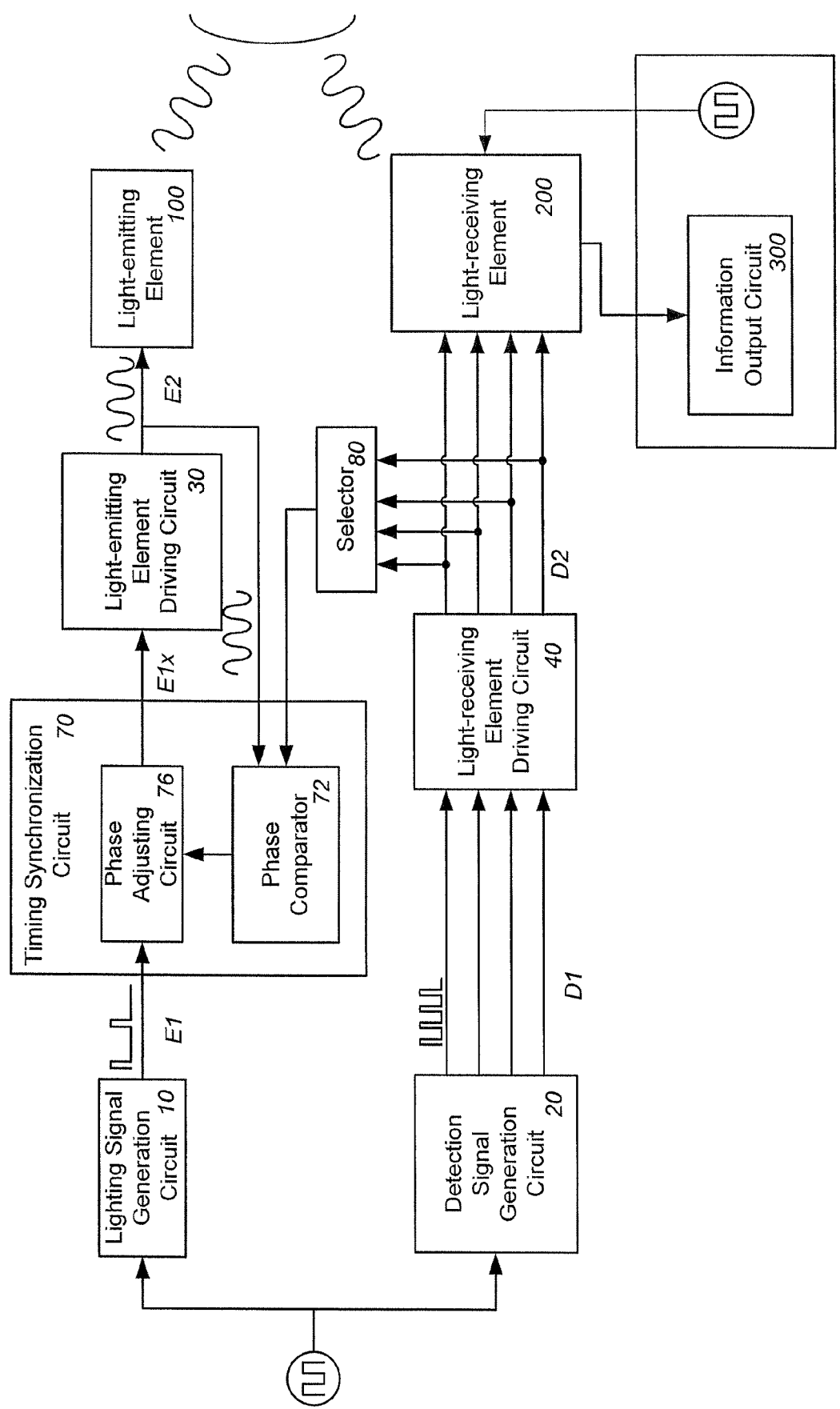
FIG. 5 is a block diagram illustrating a modification of the above apparatus.

FIG. 5 illustrates a modification of the above embodiment which is identical in configuration and function to the above embodiment except that a selector 80 is provided to input a plurality of light-receiving element driving signals D2 selectively to the phase comparator 72 of the timing synchronization circuit 70. Like parts are designated by like reference numerals, and no duplication explanation is deemed necessary.

The light-receiving element driving signals D2 are prepared respectively from the four detection timing signals D1 to define the phase ranges P0, P1, P2, and P3 of the intensity-modulated light. The selector 80 selects one of the light-receiving element driving signals D2 to feed the selected one to the phase comparator 72 in order to synchronize the light-receiving element driving signals D2 with the light-emitting element driving signal E2. For instance, the first light-receiving element driving signal D2 is selected to designate the first phase range P0 during one cycle of the intensity-modulated light, and the second light-receiving element driving signal D2 is selected during the next one cycle, and so on. Thus, the timing adjustment can be made over multiplicity of the cycles by selecting the different ones of the light-receiving element driving signals D2 for different cycles. Alternatively, the selector 80 may be arranged to select random one of the four light-receiving element driving signals D2 in consideration of that the detection of the spatial information requires the calculations over a number of the cycles.

2nd Embodiment

Figure 6:
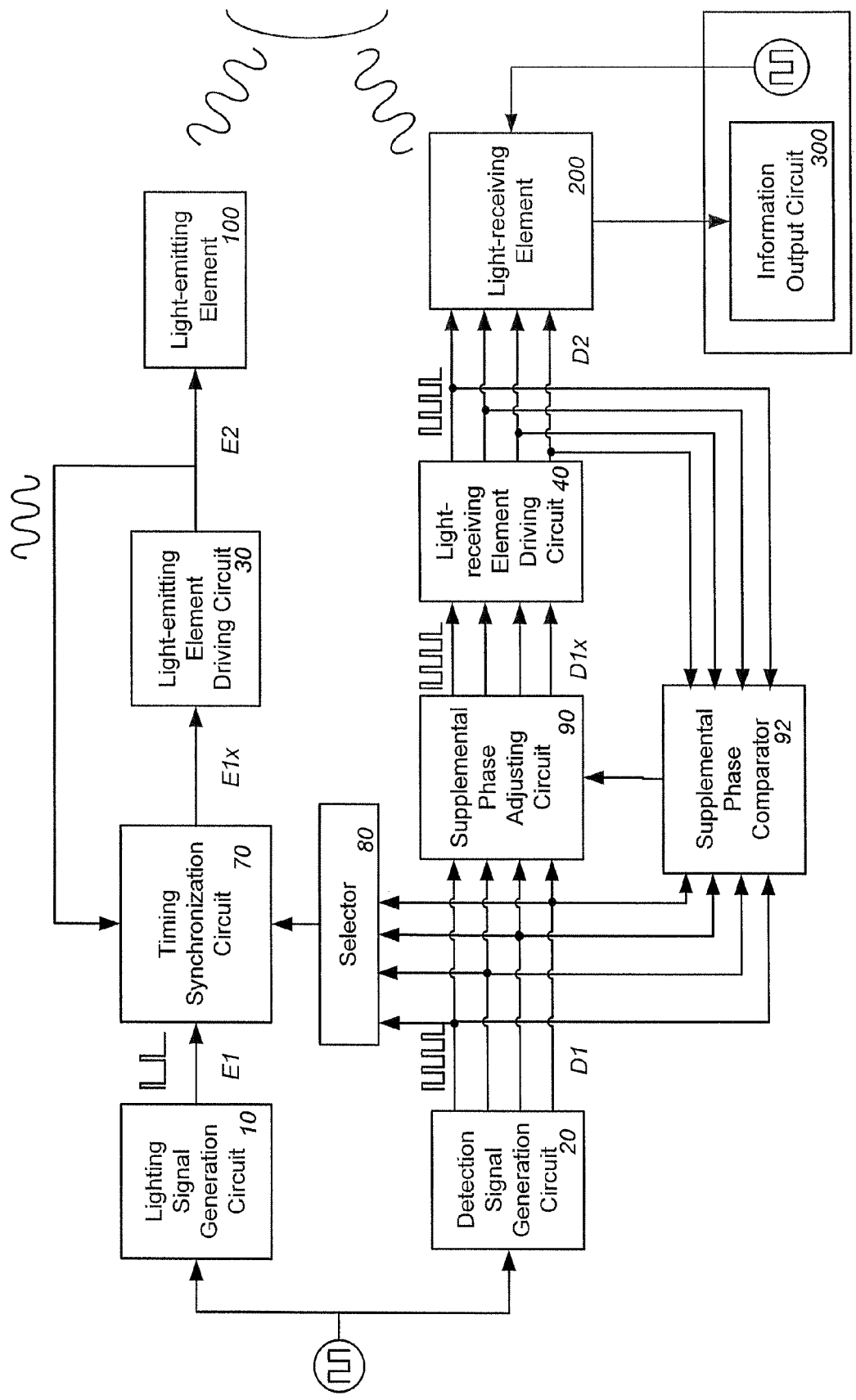
FIG. 6 is a block diagram illustrating a spatial information detection apparatus according to a second embodiment of the present invention.

FIG. 6 illustrates a spatial information detection apparatus in accordance with a second embodiment of the present invention which is basically identical in its configuration and function to the first embodiment, except for a supplemental phase adjusting circuit 90 which is interposed between the detection signal generation circuit 20 and the light-receiving element driving circuit 40 for synchronizing the detection timing signal D1 with the light-receiving element driving signal D2. This embodiment also employs the selector 80 having the above-described function. Like parts are designated by like reference numerals, and no duplicate explanation is deemed necessary.

The present embodiment includes a supplemental phase comparator 92 for phase comparison between the light-receiving element driving signals D2 and the detection timing signals D1, such that the supplemental phase adjusting circuit 90 is responsive to the detected phase difference for preparing the modified detection timing signals D1x and feeding them to the light-receiving element driving circuit 40, thereby synchronizing the detection timing signals D1 with the light-receiving element driving signals D2, and therefore feeding thus synchronized detection timing signals D1 to the timing synchronization circuit 70 through the selector 80. With this result, the light-emitting element driving signal E2 is synchronized with the detection timing signals D1, i.e., the light-receiving element driving signals D2, enabling to keep the phase difference at zero or predetermined value between the intensity-modulated light from the light-emitting element 100 and the light-receiving element driving signal D2.

3rd Embodiment

Figure 7:
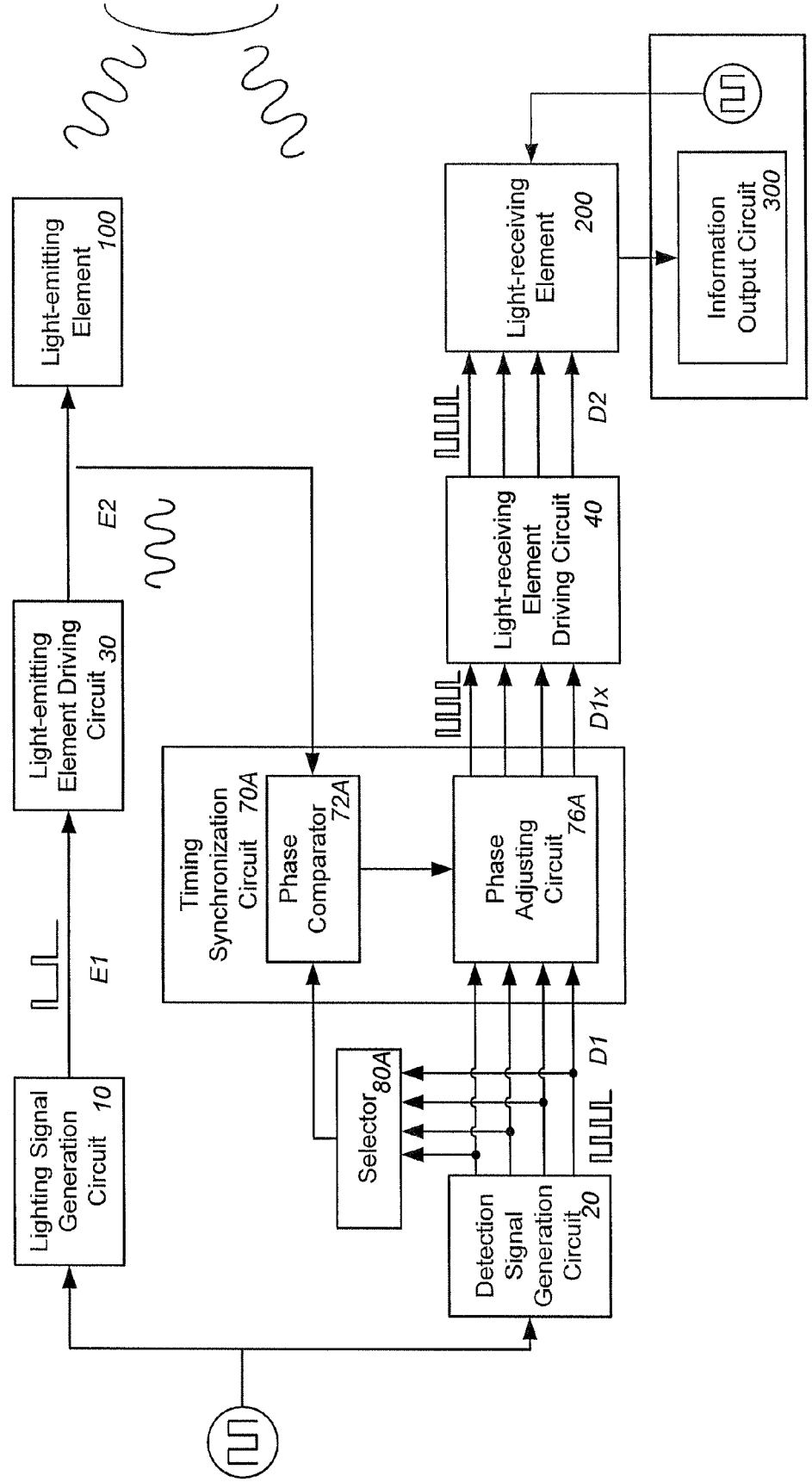
FIG. 7 is a block diagram illustrating a spatial information detection apparatus according to a third embodiment of the present invention.

FIG. 7 illustrates a spatial information detection apparatus in accordance with a third embodiment of the present invention which is basically identical in its configuration and function to the first embodiment, except that a timing synchronization circuit 70A is provided on a driving path side of driving the light-receiving element 200. Like parts are designated by like reference numerals, and no duplicate explanation is deemed necessary.

The timing synchronization circuit 70A is interposed between the detection signal generation circuit 20 and the light-receiving element driving circuit 40 in order to compare the detection timing signals D1 with the light-emitting element driving signal E2, modify the detection timing signals D1 into modified detection timing signals D1x in accordance with the detected phase difference, and input the modified detection timing signals D1x to the light-receiving element driving circuit 40, thereby synchronizing the light-receiving element driving signals D2 with the light-emitting element driving signal E2, i.e., the intensity-modulated light emitted from the light-emitting element 100. The timing synchronization circuit 70A has the same configuration as in the first embodiment of FIGS. 1 and 2. With this result, the light-receiving element 200 can detect the intensity of the reflected light from the object at each of the phase ranges in exact coincidence with the phase of the intensity-modulated light, assuring accurate detection of the spatial information. In the present embodiment, the same selector 80 as utilized in the embodiment of FIG. 5 is employed to select one of the four detection timing signals D1 for each of different cycles of the intensity-modulated light, and provide the selected signal to the timing synchronization circuit 70A.

The timing synchronization circuit 70A includes a phase comparator 72A configured to detect a phase difference between the light-emitting element driving signal E2 from the light-emitting element driving circuit 30 and the detecting timing signals D1 from the detection signal generation circuit for giving a phase shift value corresponding to the detected phase difference and a phase adjusting circuit 76A configured to shift the detection timing signals D1 by the phase shift value to modify detection timing signals D1, and output the modified detection timing signals D1x.

4th Embodiment

Figure 8:
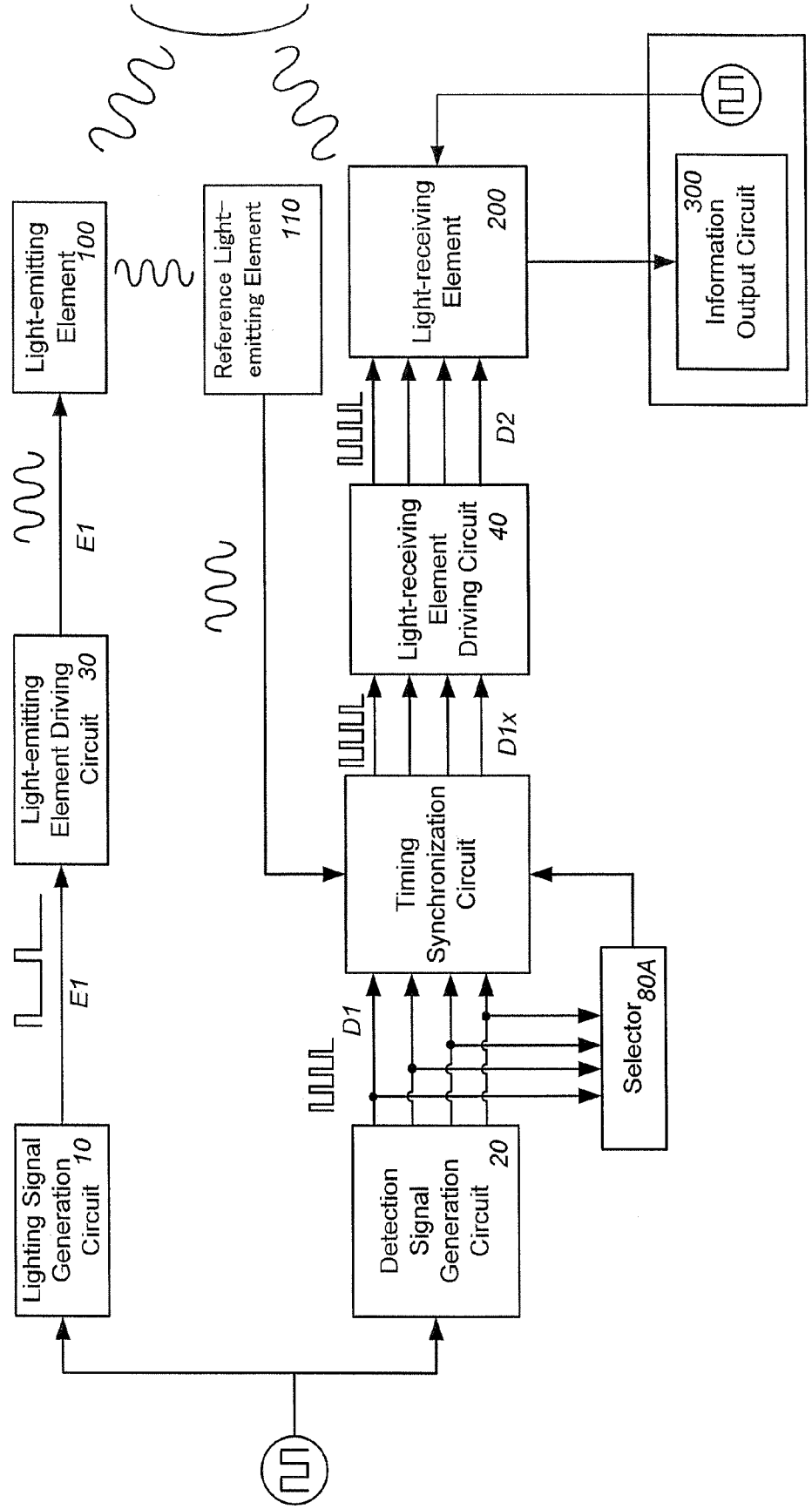
FIG. 8 is a block diagram illustrating a spatial information detection apparatus according to a fourth embodiment of the present invention.

FIG. 8 illustrates a spatial information detection apparatus in accordance with a fourth embodiment of the present invention which is basically identical in its configuration and function to the third embodiment, except that a reference light-receiving element 110 is employed to receive the intensity-modulated light directly from the light-emitting element 100 so as to provide to the timing synchronization circuit 70A an output as indicative of the cyclic variation associated with the output from the light-emitting element driving circuit 30. Like parts are designated by like reference numerals, and no duplicate explanation is deemed necessary.

The reference light-receiving element 110 is disposed adjacent to the light-emitting element 100 for receiving the intensity-modulated light directly from the light-emitting element 100 and outputting the co-phase signal to the timing synchronization circuit 70A. The reference light-receiving element 110 makes the use of a portion of the CCD image sensing element realizing the light-receiving element 200, and is oriented towards the light-emitting element 100.

5th Embodiment

Figure 9:
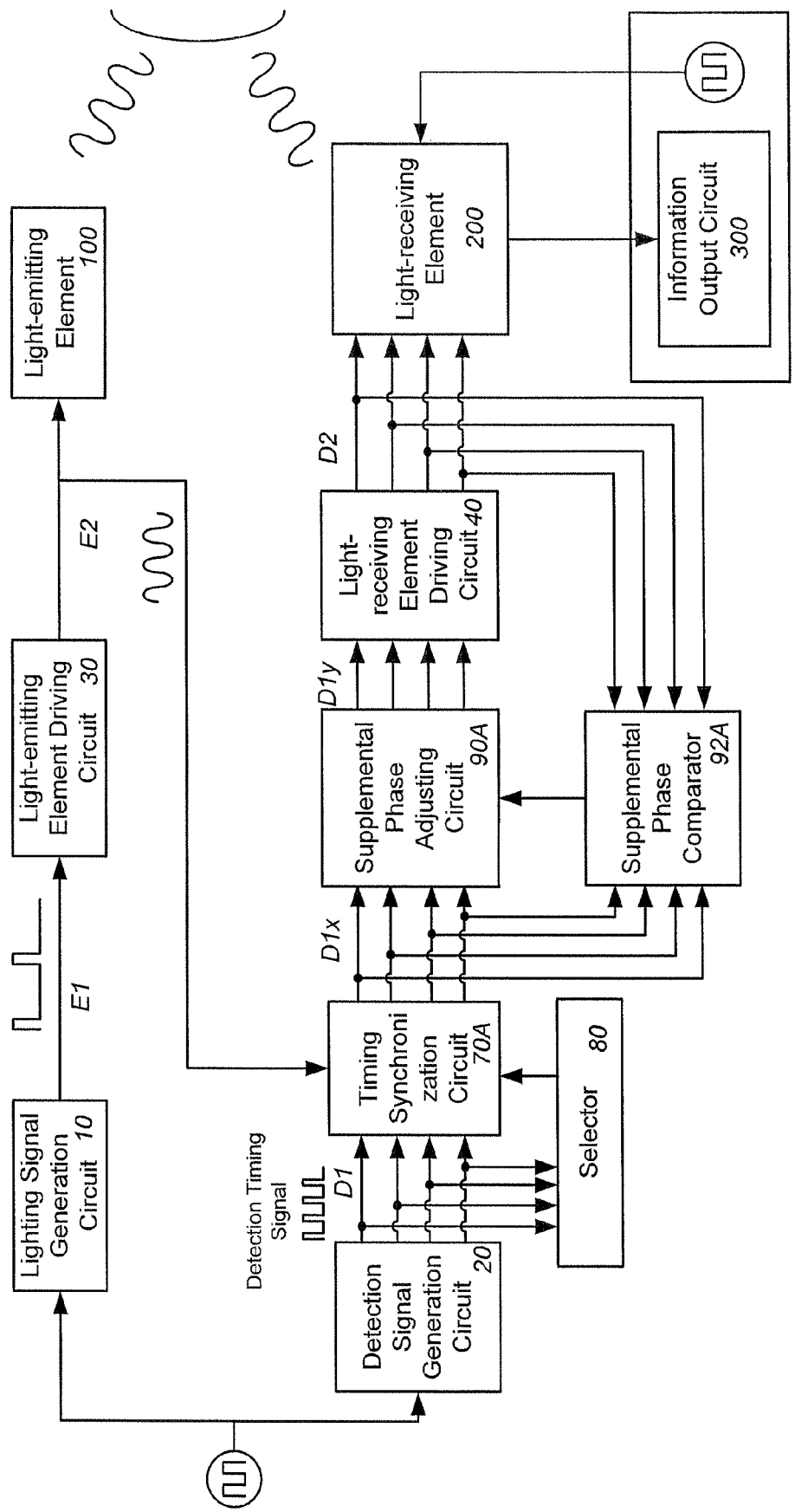
FIG. 9 is a block diagram illustrating a spatial information detection apparatus according to a fifth embodiment of the present invention.

FIG. 9 illustrates a spatial information detection apparatus in accordance with a fifth embodiment of the present invention which is basically identical in its configuration and function to the third embodiment, except for the use of a supplemental phase adjusting circuit 90A and a supplemental phase comparator 92A of the like configuration as in the second embodiment of FIG. 6, in order to make phase matching between the detection timing signals D1 and the light-receiving element driving signals D2. Like parts are designated by like reference numerals, and no duplicate explanation is deemed necessary.

The supplemental phase comparator 92A is configured to compare the phase of the modified detection timing signal D1x from the timing synchronization circuit 70A with that of the light-receiving element driving signal D2 such that the supplemental phase adjusting circuit 90A operates to further modify the modified detection timing signal D1x into a further modified detection timing signal D1y to be output to the light-receiving element driving circuit 40, thereby matching the phase of the light-receiving element driving signal D2 with that of the modified detection timing signal D1x, i.e., the intensity-modulated light in synchronous therewith. With this result, it is possible to obtain the received light intensity with regard to the phase ranges in exact coincidence with the phase of the intensity-modulated light from the light-emitting element 100 for improving the detection accuracy of the spatial information.

6th Embodiment

Figure 10:
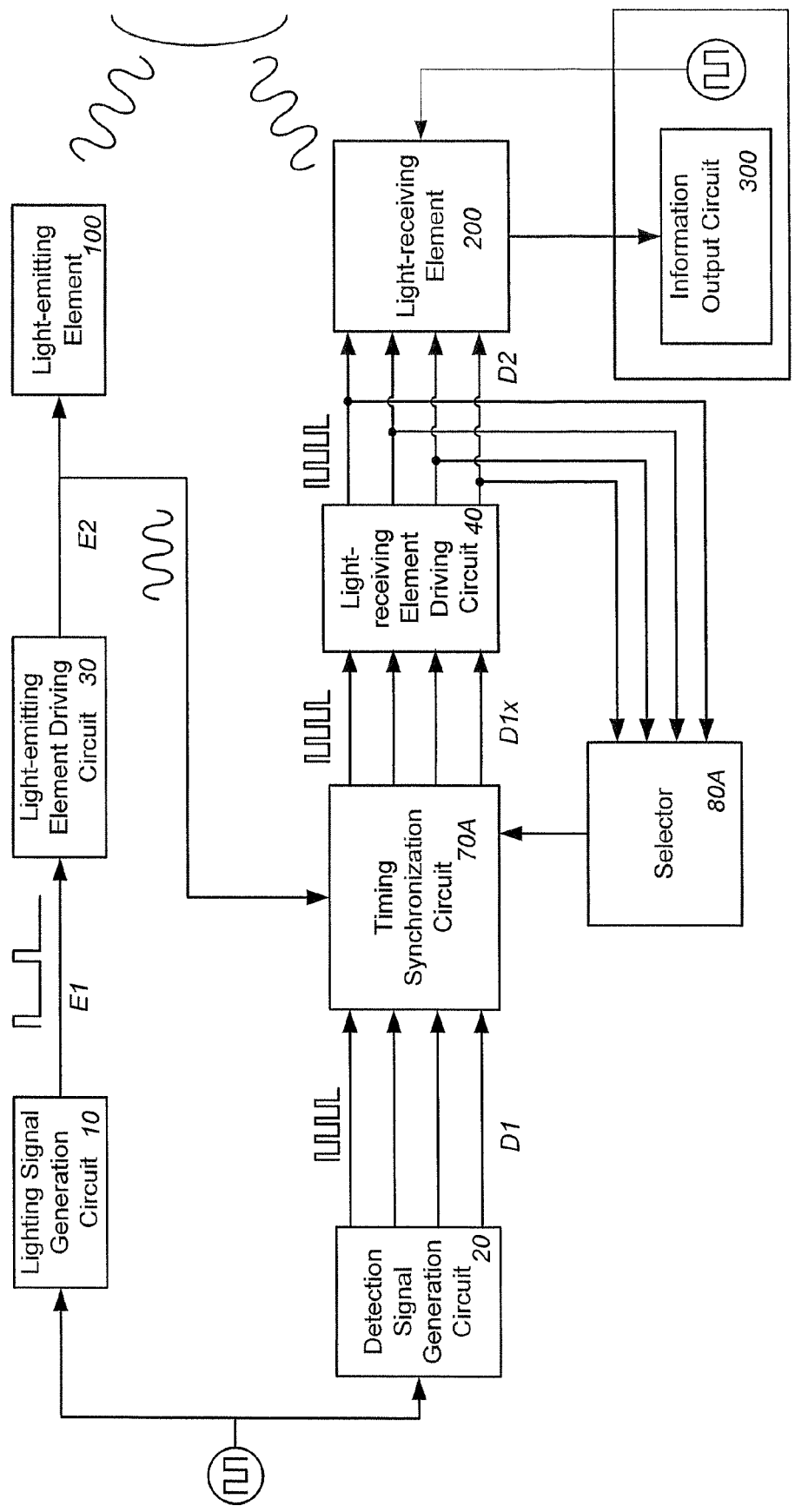
FIG. 10 is a block diagram illustrating a spatial information detection apparatus according to a sixth embodiment of the present invention.

FIG. 10 illustrates a spatial information detection apparatus in accordance with a sixth embodiment of the present invention which is basically identical in its configuration and function to the third embodiment, except that the timing synchronization circuit 70A is configured to detect a phase difference between the light-receiving element driving signal D2 and the light-emitting element driving signal E2 for modification of the detection timing signal D1. Like parts are designated by like reference numerals, and no duplicate explanation is deemed necessary.

The timing synchronization circuit 70A determines the phase difference between the light-emitting element driving signal E2 and the light-receiving element driving signal D2 output from the light-receiving element driving circuit 40 through the selector 80A, and modifies, in accordance with the phase difference, the detection timing signal D1 into a modified detection timing signal D1x which is input to the light-receiving element driving circuit 40. In this consequence, the light-receiving element driving circuit 40 prepares the light-receiving element driving signal D2 in phase with the intensity-modulated light from the light-emitting element 100 in order to operate the light-receiving element 200 in exact synchronization with the light-emitting element 100.

7th Embodiment

Figure 11:
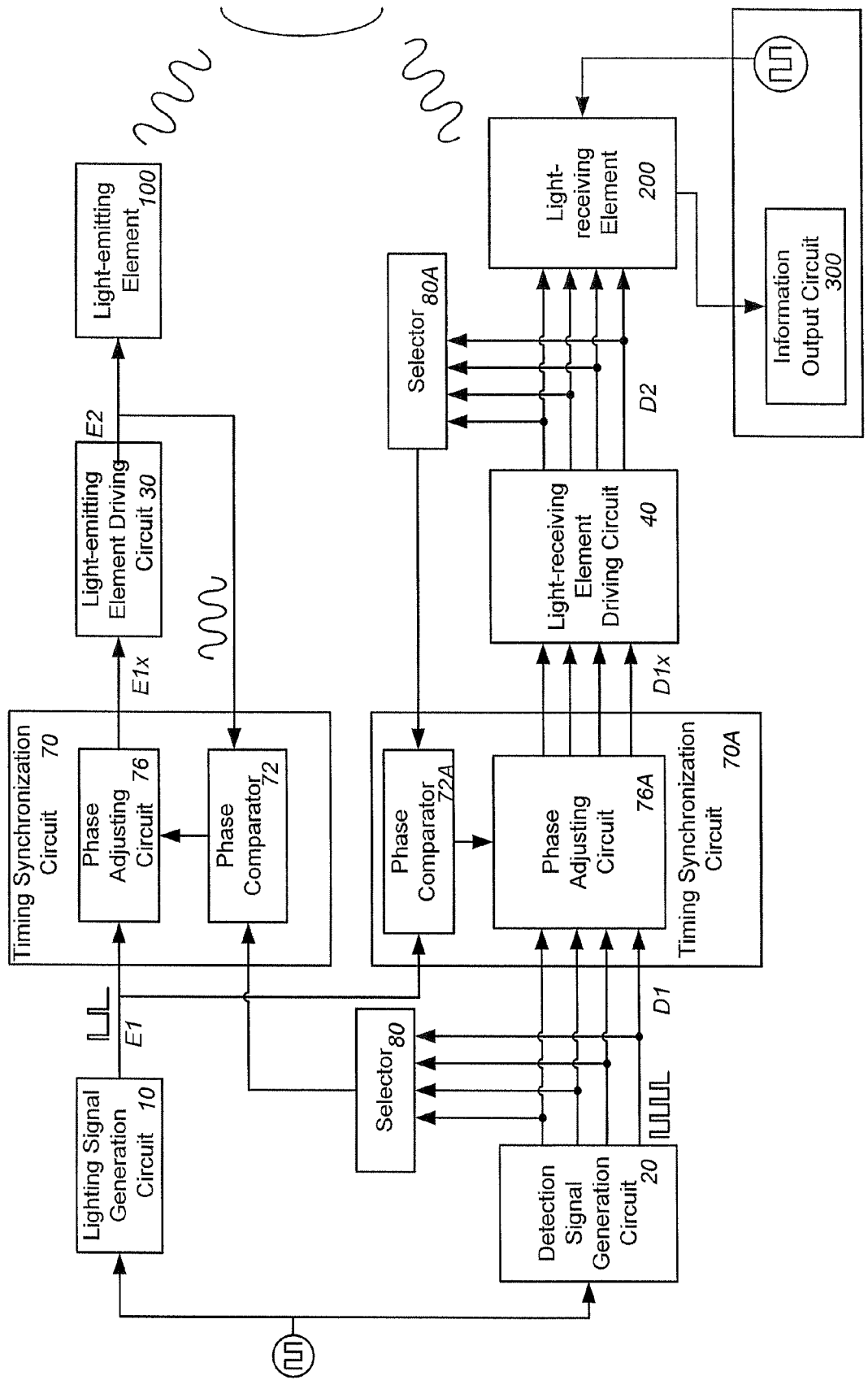
FIG. 11 is a block diagram illustrating a spatial information detection apparatus according to a seventh embodiment of the present invention.

FIG. 11 illustrates a spatial information detection apparatus in accordance with a seventh embodiment of the present invention in which a first timing synchronization circuit 70 and a second timing synchronization circuit 70A are formed respectively in driving paths of the light-emitting element 100 and the light-receiving element 200. The configuration of the timing synchronization circuits and the other parts are identical to the first or sixth embodiments. Like parts are designated by like reference numerals, and no duplicate explanation is deemed necessary.

The first timing synchronization circuit 70 is interposed between the lighting signal generation circuit 10 and the light-emitting element driving circuit 30, and is composed of a first phase comparator 72 which compares the phase of the light-emitting element driving signal E2 with that of the detection timing signal D1, and a first phase adjusting circuit 76 which modifies, based upon the detected phase difference, the lighting timing signal E1 into a modified lighting timing signal E1x output to the light-emitting element driving circuit 30. A selector 80 is interposed between the first phase comparator 72 and the detection signal generation circuit 20 to output a plurality of the detection timing signals sequentially to first phase comparator 72, in the like fashion as in the embodiment of FIG. 6.

The second timing synchronization circuit 70A is interposed between the detection signal generation circuit 20 and the light-receiving element driving circuit 40, and is composed of a second phase comparator 72A which determines a phase difference between the lighting timing signal E1 and the light-receiving element driving signal D2, and a second phase adjusting circuit 76A which modifies, based upon the detected phase difference, the detection timing signal D1 into a modified detection timing signal D1x output to the light-receiving element driving circuit 40. In this embodiment, a selector 80A of the same configuration as that in the embodiment of FIG. 5 is utilized to select one of the four light-receiving element driving signals D2 for each one cycle of the intensity-modulated light and input the selected signal to the second phase comparator 72A.

The two timing synchronization circuits 70 and 70A are utilized in the present embodiment to modify the lighting timing signal E1 and the detection timing signal D1 in a direction of shifting the phases thereof to come closer from each other, enabling to operate the light-receiving element 200 in exact phase synchronization with the intensity-modulated light from the light-emitting element 100 for improving the detection accuracy of the spatial information.

8th Embodiment

Figure 12:
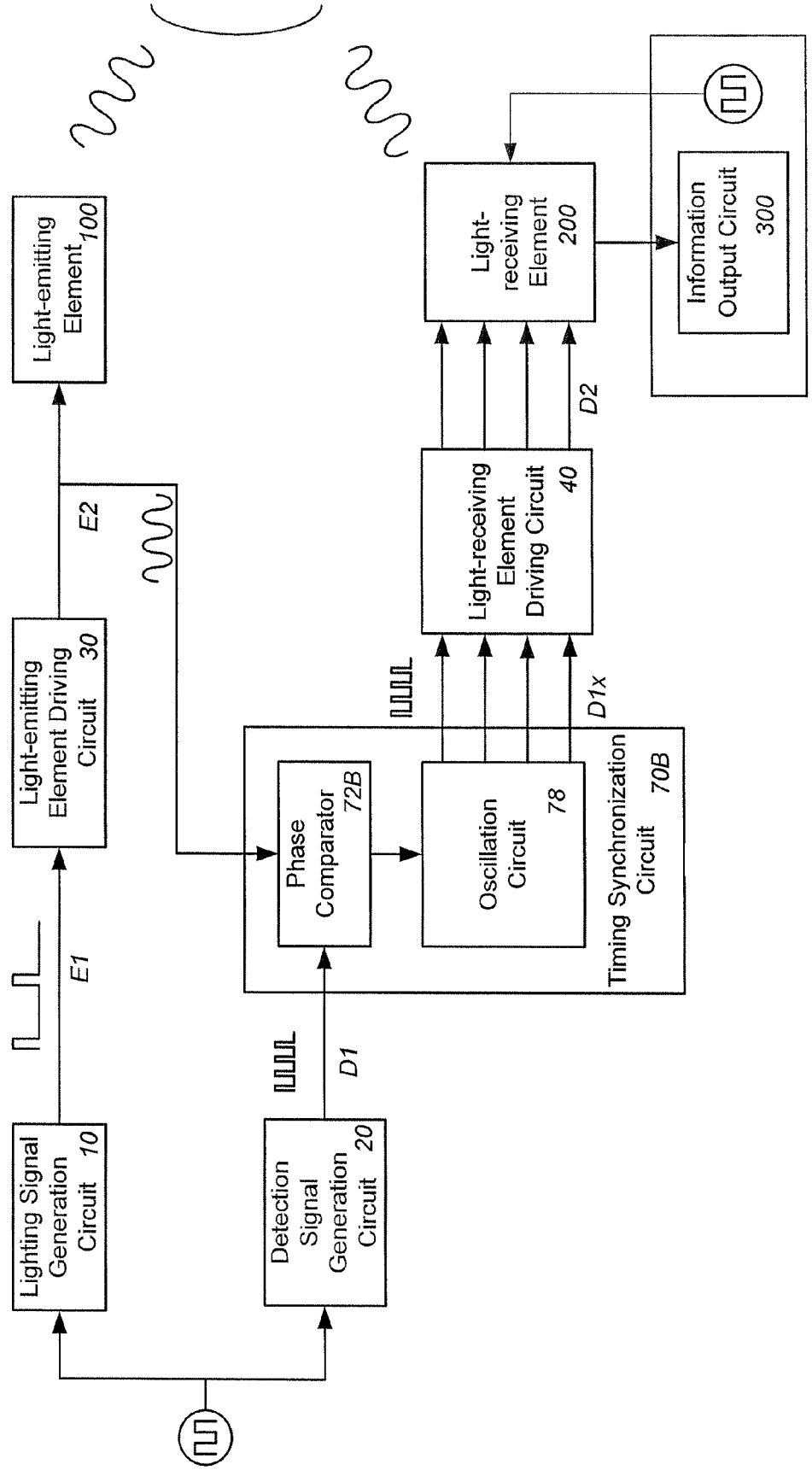
FIG. 12 is a block diagram illustrating a spatial information detection apparatus according to an eighth embodiment of the present invention.

FIG. 12 illustrates a spatial information detection apparatus in accordance with an eighth embodiment of the present invention which is identical in its configuration and function to the sixth embodiment of FIG. 10 except for internal configurations of a timing synchronization circuit 70B and the related configurations. Like parts are designated by like reference numerals, and no duplicate explanation is deemed necessary.

The timing synchronization circuit 70B includes an oscillation circuit 78 which generates a signal of which frequency varies with a varying input voltage, and a phase comparator 72B which detects a phase difference between the detection timing signal D1 and the light-emitting element driving signal E2. The detected phase difference is fed to the oscillation circuit 78 which in turn provides the signal which has the frequency varying based upon the phase difference, and which is output as the modified detection timing signal D1x to the light-receiving element driving circuit 40. With this result, the light-receiving element driving signal D2 comes into phase synchronization with the intensity-modulated light from the light-emitting element 100, enabling to synchronize the operations of the light-emitting element 100 and the light-receiving element 200.

9th Embodiment

Figure 13:
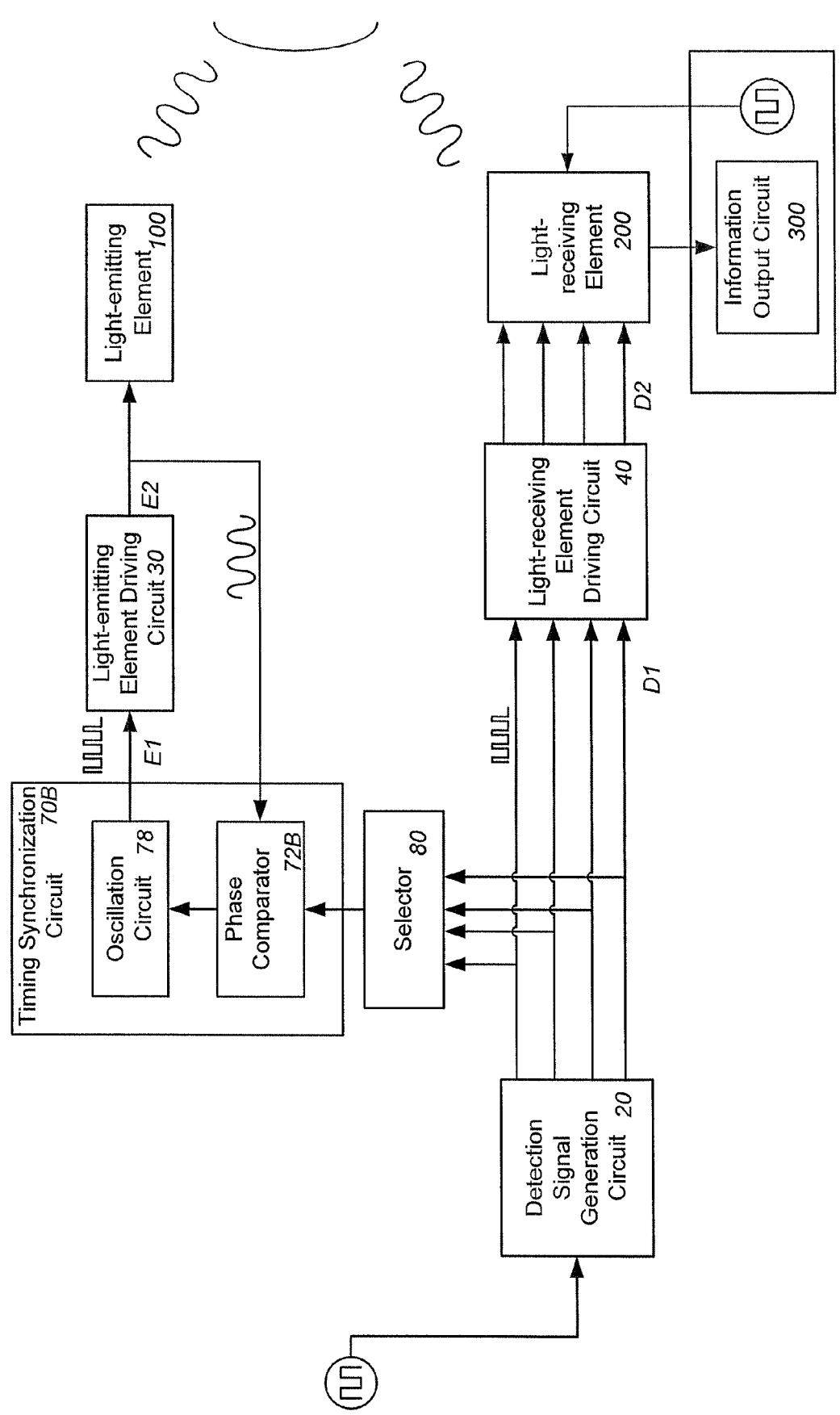
FIG. 13 is a block diagram illustrating a spatial information detection apparatus according to a ninth embodiment of the present invention.

FIG. 13 illustrates a spatial information detection apparatus in accordance with a ninth embodiment of the present invention which is identical to the embodiment of FIG. 12 except that that the timing synchronization circuit 70B gives an output defining the lighting timing signal. Like parts are designated by like reference numerals, and no duplicate explanation is deemed necessary.

The timing synchronization circuit 70B is composed of a phase comparator 72B and an oscillation circuit 78. The phase comparator 72B is configured to compare the detection timing signal D1 from the detection timing generation circuit 20 with the light-emitting element driving signal E2 from the light-emitting element driving circuit 30 to provide a voltage indicative of the phase difference between the signals to the oscillation circuit 78. In the present embodiment, the oscillation circuit 78 defines the lighting signal generation circuit and is configured to generate the lighting timing signal E1 output to the light-emitting element driving circuit 30. The oscillation circuit is provided to regulate the frequency of the lighting timing signal E1 in accordance with the output voltage from the phase comparator 72B, and is configured to determine the frequency of the lighting timing signal E1 to keep a constant phase difference between the detection timing signal D1 detected at the phase comparator 72B and the light-emitting element driving signal E2. The detection timing signal D1 is fed to the phase comparator 72B through the selector 80 of the same configuration as in the embodiment of FIG. 11.

Figure 14:
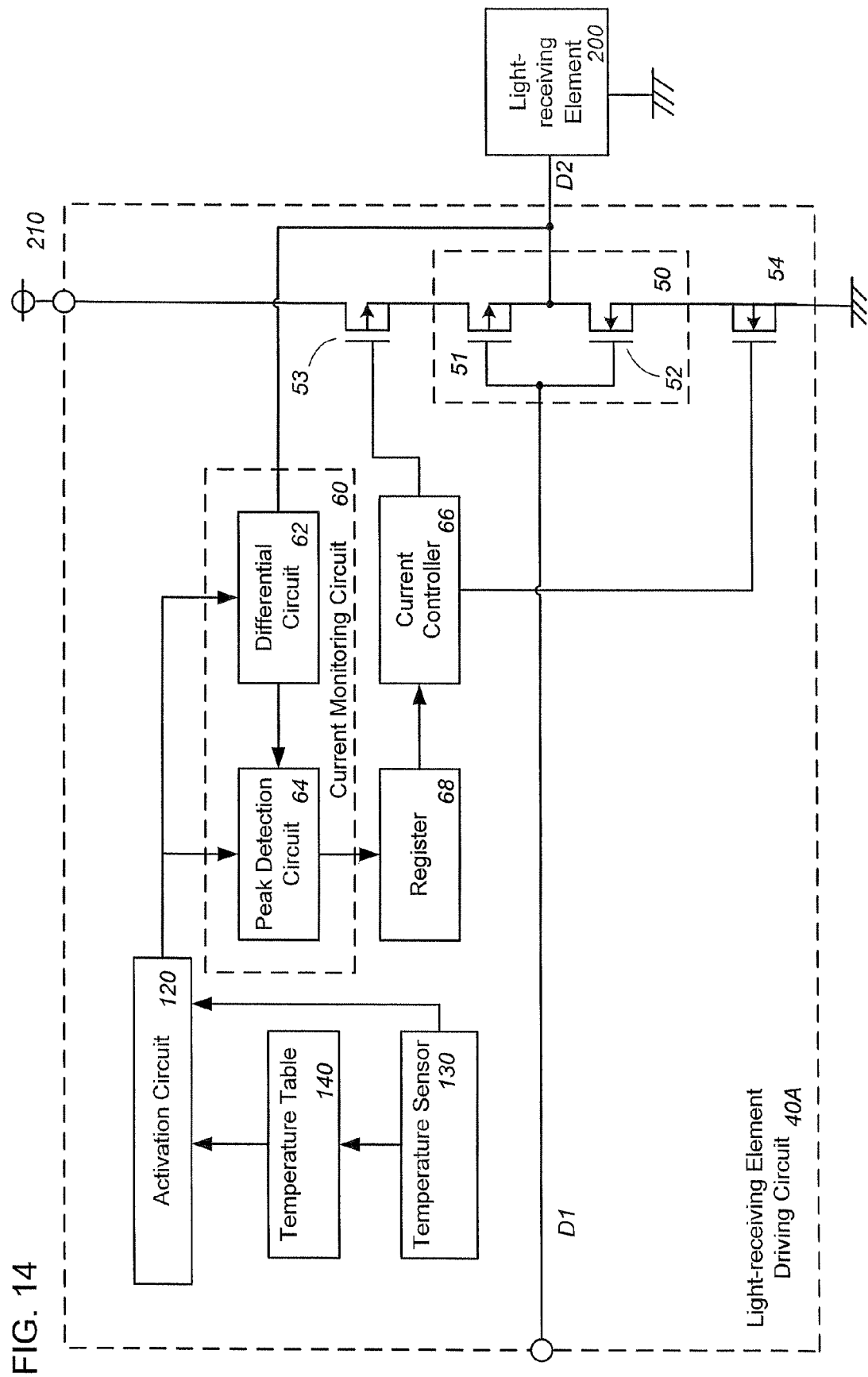
FIG. 14 is a block diagram illustrating one light-receiving element driving circuit used in the apparatus of the present invention.

FIG. 14 illustrates an exemplary light-receiving element driving circuit which may be applied to the above embodiments, and is basically identical in its operation to the light-receiving element driving circuit 40 in the embodiment of FIG. 1. Like parts are designated by like reference numerals, and no duplicate explanation is deemed necessary.

The light-receiving element driving circuit 40A includes a current monitoring circuit 60 composed of a differential circuit 62 configured to obtain an instant varying rate of a light-receiving element driving current D2 flowing through the light-receiving element 200, and a peak detection circuit 64 configured to detect a maximum of the instant varying rates obtained at the differential circuit 62. The maximum of the varying rates detected the peak detection circuit 64 is updated and stored in a register 68. As is discussed with reference to the first embodiment, the current controller 66 controls, based upon the maximum of the current varying rate read out from the register 68, FETs 53 and 54 acting as individual resistors in order to keep the charging current flowing into the light-receiving element 200 from the DC power source 210 through the output switch 50 at the predetermined level, and also keep the discharging current flowing from the light-receiving element 200 to the ground through the output switch 50 at the predetermined level. With this consequence, it is assured to give constant rising and falling times for the charging current and the discharging current flowing through the light-receiving element 200 in response to the detection timing signal D1, which enables to operate the light-receiving element 200 free from the ambient temperature for accurate detection of the spatial information.

The light-receiving element driving circuit 40A includes a temperature sensor 130A for sensing the ambient temperature, a temperature table 140 for storing the detected temperatures at a predetermined time interval, and an activation circuit 120 connected thereto. The activation circuit 120 is configured to compare an instant temperature with a past temperature recorded at a predetermined past time, and activate the differential circuit 62 and the peak detection circuit 64 only when the temperature difference exceeds a predetermined threshold, and otherwise deactivate the same. When the temperature difference is below the threshold, the current controller 66 controls the current flowing through the light-receiving element 200 based upon the current value retrieved from the register. Consequently, it is possible to stop the differential circuit and the peak detection circuit within a temperature range that will not give an adverse effect on the operation of the light-receiving element 200, thereby reducing the power consumption.

Figure 15:
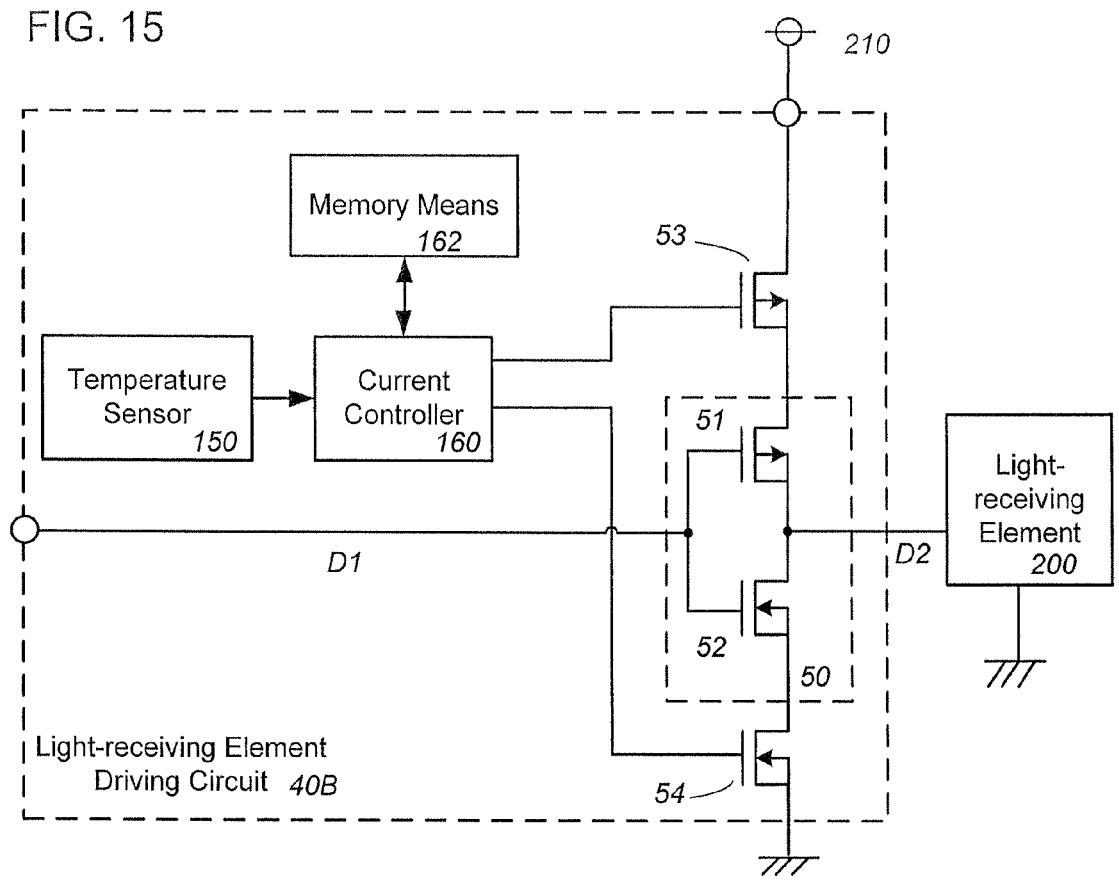
FIG. 15 is a block diagram illustrating another light-receiving element driving circuit used in the apparatus of the present invention.

FIG. 15 illustrates another light-receiving element driving circuit which may be applied to the above embodiment and is configured to modify a varying rate of the light-receiving element driving current D2 based upon the ambient temperature for the purpose of eliminating ambient temperature-dependent variations in the operational response of the light-receiving element 200. The light-receiving element driving circuit 40B includes a temperature sensor 150 for sensing the ambient temperature, and a memory means 162 for storing predetermined control parameters associated with the detected temperatures. The current controller 160 reads the control parameter corresponding to the detected temperature from the memory means 162 to apply the voltage defined by the control parameter to the gates of FETs 53 and 54 acting respectively as resistors for regulating the on-resistance of each FET, thereby keeping a constant current varying rate of the charging current flowing into the light-receiving element 200 from the DC power source 210 through the output switch 50 and the discharging current flowing from the light-receiving element 200 to the ground through the output switch 50. With this consequence, it is assured to give constant rising and falling times for the charging current and the discharging current flowing through the light-receiving element 200, which enables to operate the light-receiving element 200 free from the ambient temperature for accurate detection of the spatial information.

Figure 16:
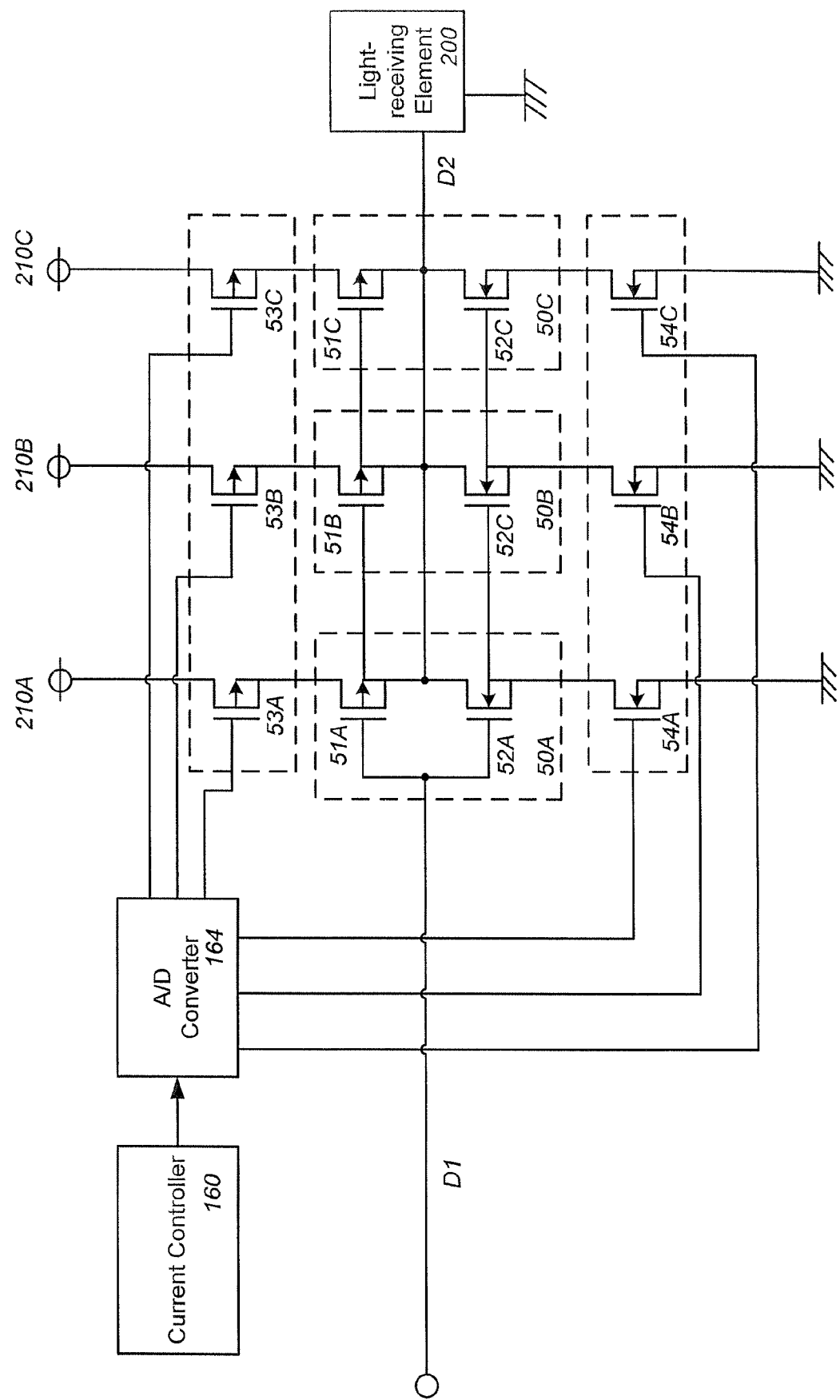
FIG. 16 is a block diagram illustrating a modification of the above light-receiving element driving circuit.

FIG. 16 illustrates a current control scheme applicable to the above light-receiving element driving circuit. In this instance, a plurality of DC power supplies 210A, 210B, and 210C are utilized to supply a current to the light-receiving element 200 from arbitrary combination of the DC power sources, while output switches 50A, 50B, and 50C are interposed between the respective DC power sources and the ground. Each output switch has the same configuration as that used in the embodiment of FIG. 1. The light-receiving element 200 is connected between each node of the series connected FETs 51A, 52A; 51B, 52B; 51C, 52C, and the ground. The gates of FETs defining each output switch are connected to each other to receive the detection timing signal D1 simultaneously, such that FETs are turned on and off in accordance with the detection timing signal D1 in the like manner, as in the embodiment of FIG. 1, for charging and discharging the light-receiving element 200.

Each of the output switches 50A, 50B, and 50C is connected in series with each of charge current controlling FETs 53A, 53B, and 53C serving as resistors, and also with each of discharge current controlling FETs 54A, 54B, and 54C serving as resistors. The current controller 160 activates an arbitrary combination of the charge current controlling FETs and the discharge current controlling FETs to flow the current through the light-receiving element 200 at a predetermined varying rate. The current controller 160 provides an analogue voltage defining a current value corresponding to the predetermined varying rate to an A/D converter 164 which generates digital signals determining respectively as to which combination of the charge current controlling FETs 53A, 53B, and 53C are to be turned on, and which combination of the discharge current controlling FETs 54A, 54B, and 54C are to be turned on. The digital signals are applied to the gates of the charge current and discharge current controlling FETs to turn on the FETs of the designated combinations for controlling the current flowing through the light-receiving element 200.

Thus, the plurality of the charge current controlling FETs, which are respectively connected to the plurality of the output switches, can be turned on in the arbitrary combination, thereby enabling to precisely control the charging current to the light-receiving element 200. In this instance, the charge current controlling FETs 53A, 53B, and 53C are made to have equal or different on-resistance. The same is true for the discharge current controlling FETs 54A, 54B, and 54C.

10th Embodiment

Figure 17:
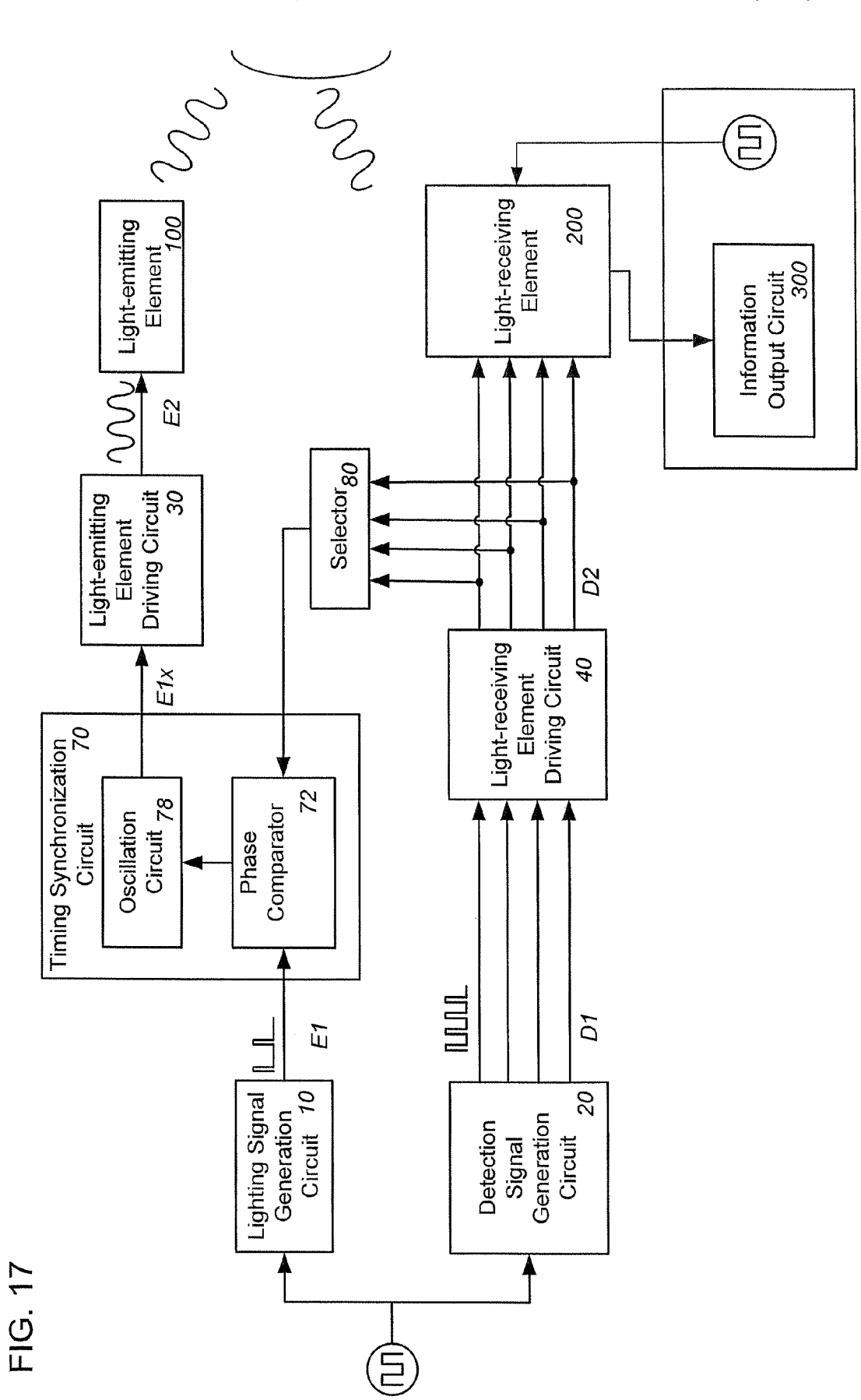
FIG. 17 is a block diagram illustrating a spatial information detection apparatus according to a tenth embodiment of the present invention.

FIG. 17 illustrates a spatial information detection apparatus in accordance with a tenth embodiment of the present invention which is identical in its configuration and function to the embodiments of FIGS. 1 and 5 except for the internal configuration of the timing synchronization circuit 70. Like parts are designated by like reference numerals, and no duplicate explanation is deemed necessary.

The timing synchronization circuit 70 is composed of an oscillation circuit 78 for generating a signal of which frequency varies with the input voltage, and a phase comparator 72 for detecting a phase difference between the lighting timing signal E1 and the light-receiving element driving signal D2. The detected phase difference is fed in the form of a voltage signal to the oscillation circuit 78 which provides the signal of which frequency varies with the phase difference, and output the signal as the modified lighting timing signal E1x to the light-receiving element driving circuit 30. With this result, the intensity-modulated light is emitted from the light-emitting element 100 in phase with the light-receiving element driving signal D2, enabling to synchronize the operations of the light-emitting element 100 and the light-receiving element 200.

The individual features described in each of the above embodiments and modifications can be combined or replaced with the features of the other embodiments and modifications, which is also within the scope of the present invention.

Further, although the above embodiments are explained to obtain the distance to the object within the target space as one typical spatial information, the present invention should not be restricted thereto and can be equally applied to an identification of the object based upon reflectivity of the light from the object which is obtained through analysis of the intensity of the intensity-modulated light reflected from the object.

The invention claimed is:

1. A spatial information detection apparatus comprising:
   a light-emitting element (100) configured to emit an intensity-modulated light to a target space;
   a lighting signal generation circuit (10) configured to generate a lighting timing signal (E1) which determines a lighting timing of said light-emitting element,
   a light-emitting element driving circuit (30) configured to output a light-emitting element driving signal (E2) in response to said lighting timing signal for generation of said intensity-modulated light from said light-emitting element;
   a light-receiving element (200) configured to receive said intensity-modulated light reflected from an object in said target space;
   an information output circuit (300) configured to extract a light intensity of the light received at the said light-receiving element for each of a plurality of phase ranges (P0, P1, P2, and P3), determine a relation between said intensity-modulated light from said light-emitting element and said intensity-modulated light received at said light-receiving element based upon a variation of said extracted light intensities, and output spatial information within said target space;
   a light-receiving element driving circuit (40; 40A; 40B) configured to output a plurality of light-receiving element driving signals D2 which are out of phase relation from each other to said light-receiving element in order to activate said light-receiving element for each of said phase ranges;
   a detection signal generation circuit (20) configured to provide to said light-receiving element driving circuit a detection timing signal (D1) for determination of a timing of generating said light-receiving element driving signal; and
   a timing synchronization circuit (70; 70A; 70B) configured to compare a cyclic variation associated with the output from said light-emitting element driving circuit with a cyclic variation determined by said detection timing signal, and modify at least one of said detection timing signal (D1) and said lighting timing signal (E1) in order to keep a constant phase difference between said cyclic variations.

2. A spatial information detection apparatus as set forth in claim 1, wherein said timing synchronization circuit (70) is configured to obtain a cyclic variation of said light-receiving element driving signal (D2) from said light-receiving element driving circuit as said cyclic variation to be determined by said detection timing signal for comparison with the light-emitting element driving signal (E2) from said light-emitting element driving circuit (30).

3. A spatial information detection apparatus as set forth in claim 1 or 2, wherein said timing synchronization circuit (70) is configured to modify said lighting timing signal into a modified lighting timing signal (E1x) and feed said modified lighting timing signal to said light-emitting element driving circuit.

4. A spatial information detection apparatus as set forth in claim 3, wherein said timing synchronization circuit (70) is interposed between said lighting signal generation circuit (10) and said light-emitting element driving circuit (30), and comprises:
   a phase adjusting circuit (76) configured to shift a phase of the lighting timing signal output from said lighting signal generation circuit to said light-emitting element driving circuit (30) by variable a phase shift value, and
   a phase comparator (72) configured to determine said phase shift value in accordance with a phase difference between the cyclic variation output from said light-receiving element driving element circuit and the light-emitting element driving signal from said light-emitting element driving circuit (30).

5. A spatial information detection apparatus as set forth in claim 3, wherein said light-receiving element driving circuit (40) is configured to determine said light-receiving element driving signal based upon a plurality of detection timing signals output from said detection signal generation circuit, and
   a selector (80 is provided to selectively extract the light-receiving element driving signals which are out of phase relation from each other,
   said timing synchronization circuit (70) being configured to modify said lighting timing signals based upon a phase difference between said light-receiving element driving signals (D2) selected from said selector 80 and the cyclic variation (E2) associated with the output from said light-emitting element driving circuit (30).

6. A spatial information detection apparatus as set forth in claim 5, wherein said information output circuit (300) is configured to integrate the received light intensities over a plurality of times for each of said phase regions (P0, P1, P2, P3) corresponding to said light-receiving element driving signals,
   said information output circuit being configured to obtain the received light intensity from said light-receiving element (200) at each of said phase regions (P0, P1, P2, P3) in synchronous with the light-receiving element driving signal D2 selected from said selector (80).

7. A spatial information detection apparatus as set forth in claim 2, further including:
   a supplemental phase adjusting circuit (90 interposed between said detection signal generation circuit (20) and said light-receiving element driving circuit (40) and configured to shift the phase of said detection timing signal by a variable shift phase value and output said detection timing signal to said light-receiving element driving circuit;
   a supplemental phase comparator (92) configured to detect a phase difference between said detection timing signal (D1) and the cyclic variation (D2) output from said light-receiving element driving circuit for providing an output indicative of said phase difference to said supplemental phase adjusting circuit;
   said supplemental phase adjusting circuit (90) being configured to determine said phase shift value based upon said phase difference for keeping a predetermined value given for the phase difference between said detection timing signal (D1) and said light-receiving element driving signal (D2) from the light-receiving element driving circuit.

8. A spatial information detection apparatus as set forth in claim 1, wherein said timing synchronization circuit (70; 70A) is configured to compare the cyclic variation (E2) resulting from the output from said light-emitting element driving circuit (30) with said detection timing signal (D1) from the detection signal generation circuit (20).

9. A spatial information detection apparatus as set forth in claim 8, wherein said timing synchronization circuit (70) is configured to modify said lighting timing signal to provide the modified lighting timing signal (E1x) to said light-emitting element driving circuit.

10. A spatial information detection apparatus as set forth in claim 8, wherein said timing synchronization circuit (70A) is configured to modify said detection timing signal (D1) into a modified detection timing signal (D1x) and provide the modified detection timing signal to said light-receiving element driving circuit (40).

11. A spatial information detection apparatus as set forth in claim 10, wherein said timing synchronization circuit (70A) is interposed between said detection signal generation circuit (20) and said light-receiving element driving circuit (40), and comprises:
   a phase adjusting circuit (76A) configured to shift a phase of said detection timing signal (D1) from said detection signal generation circuit by a variable phase shift value and output said detection timing signal to said light-receiving element driving circuit (40); and
   a phase comparator (72A) configured to determine said phase shift value based upon the phase difference between the cyclic variation output from said light-emitting element driving circuit and said detection timing signal from said detection signal generation circuit.

12. A spatial information detection apparatus as set forth in claim 10, further including:
   a supplemental phase adjusting circuit (90A) interposed between said timing synchronization circuit (70A) and said light-receiving element driving circuit (40) and configured to shift a phase of said modified detection timing signal (D1x) by a variable phase shift value;
   a supplemental phase comparator (92A configured to detect a phase difference between said modified detection timing signal (D1x) and the light-receiving element driving signal (D2) from said light-receiving element driving circuit (40) to provide an output indicative of said phase difference to said supplemental phase adjusting circuit (90A), and
   said supplemental phase adjusting circuit (90A) configured to determine said phase shift value based upon said phase difference for keeping a predetermined value given for the phase difference between said modified detection timing signal (D1x) from said timing synchronization circuit (70A) and said light-receiving element driving signal (D2) from the light-receiving element driving circuit (40).

13. A spatial information detection apparatus as set forth in claim 10, further including:
   a reference light-receiving element (110) configured to receive a portion of said intensity modulated light from said light-emitting element to output an corresponding light intensity; and
   said timing synchronization circuit (70A) being configured to use the light intensity as indicative of the cyclic variation associated from the output from said light-emitting element driving circuit (30).

14. A spatial information detection apparatus as set forth in claim 10, wherein said timing synchronization circuit (70B) comprises:
- an oscillation circuit (78) configured to use a signal of which frequency varies with a varying input voltage and provide the signal as said modified detection timing signal to said light-receiving element driving circuit (40), and
- a phase comparator (72B) configured to generate a voltage indicative of a phase difference between the cyclic variation (E2) associated with the output from said light-emitting element driving circuit (30) and the detection timing signal (D1x) from said detection signal generation circuit (20), and provide said voltage to said oscillation circuit.

15. A spatial information detection apparatus as set forth in claim 1, wherein said timing synchronization circuit comprises:
- a first timing synchronization circuit (70) interposed between said lighting signal generation circuit (10) and said light-emitting element driving circuit; and
- a second timing synchronization circuit (70A) interposed between detection signal generation circuit and said light-receiving element driving circuit;
- said first timing synchronization circuit (70) comprising a first phase adjusting circuit (76) configured to shift a phase of said lighting timing signal (E1) from said lighting signal generation circuit (10) by a variable phase shift value, and output said lighting timing signal to said light-emitting element driving circuit (30), a first phase comparator (72) configured to determine said phase shift value based upon a phase difference between the cyclic variation (E2) output from said light-emitting element driving circuit (30) and said detection timing signal (D1) from said detection signal generation circuit (20);
- said second timing synchronization circuit (70A) comprising a second phase adjusting circuit (76A) configured to shift a phase of said detection timing signal (D1) from said detection signal generation circuit (20) by a variable phase shift amount, and output said detecting timing signal to said light-receiving element driving circuit (40), and a second phase comparator (72A) configured to determine said phase shift value based upon a phase difference between said lighting timing signal (E1) from said lighting signal generation circuit (10) and said light-receiving element driving signal (D2) from said light-receiving element driving circuit (40).

16. A spatial information detection apparatus as set forth in claim 1, wherein said light-receiving element has a capacitive reactance and is configured to operate on a DC current supplied from a DC power source (210),
said light-receiving element driving circuit (40B) comprising:
- an output switch (50) connected between said DC power source and said light-receiving element to supply said DC current to said light-receiving element in synchronization with said detection timing signal;
- a temperature sensor (150) for detection of an ambient temperature; and
- a current controller (160) configured to regulate the current being fed to said light-receiving element in such a manner as to keep the current being fed to said light-receiving element at a predetermined varying rate.

17. A spatial information detection apparatus as set forth in claim 16, wherein said current controller (160) includes a memory means (162) configured to store the varying rate of the current through said light-receiving element in association with the temperature,
said current controller being configured to read out from said memory means (162) the current varying rate corresponding to the temperature output from said temperature sensor (150) and control the current flowing through the light-receiving element in match with the reading of the current varying rate.

18. A spatial information detection apparatus as set forth in claim 1, wherein said light-receiving element has a capacitive reactance and is configured to operate on a DC current supplied from a DC power source (210),
said light-receiving element driving circuit 40A comprising:
- an output switch (50) connected between said DC power source and said light-receiving element to supply said DC current to said light-receiving element in synchronization with said detection timing signal;
- a current monitoring circuit (60) configured to monitor a varying rate of the current being fed to said light-receiving element and provides a current variation output indicative of the varying rate; and
- a current controller (66) configured to operate in response to said current variation output for regulating the current being fed to said light-receiving element in such a manner as to keep the current being fed to said light-receiving element at a predetermined varying rate.

19. A spatial information detection apparatus as set forth in claim 18, wherein said current monitoring circuit (60) comprises:
- a differential circuit (62) configured to calculate an instant varying rate of the current flowing through the light-receiving element; and
- a peak detection circuit (64) configured to detect a maximum of said instant varying rate from said differential circuit;
- said current controller (66) being configured to control the current flowing through said light-receiving element based upon said maximum of the instant varying rate from said peak detection circuit in order to keep the varying rate at a predetermined value.

20. A spatial information detection apparatus as set forth in claim 19, wherein said light-receiving element driving circuit further comprising:
- a temperature sensor (130) for detection of an ambient temperature;
- a register (68) configured to hold a maximum of said instant varying rate detected at said peak detection circuit (64);
- a temperature table (140) configured to store the output of said temperature sensor at a predetermined interval; and
- an activation circuit (120) configured to activate said differential circuit and said peak detection circuit only when there is detected a temperature difference exceeding a predetermined level between a current temperature and a past temperature recorded at a predetermined past time.

21. A spatial information detection apparatus comprising:
- a light-emitting element (100) configured to emit an intensity-modulated light to a target space;
- a lighting signal generation circuit (10) configured to generate a lighting timing signal (E1) which determines a lighting timing of said light-emitting element,
- a light-emitting element driving circuit (30) configured to output a lighting-element driving signal (E2) in response to said lighting timing signal for generation of said intensity-modulated light at said light-emitting element;

a light-receiving element (200) configured to receive said intensity-modulated light reflected from an object in said target space;

an information output circuit (300 configured to obtain a light intensity of the light received at the said light-receiving element for each of a plurality of phase ranges (P0, P1, P2, P3), determine a relation between said intensity-modulated light from said light-emitting element and said intensity-modulated light received at said light-receiving element based upon a variation of said light intensities, and output spatial information within said target space;

a light-receiving element driving circuit (40; 40A; 40B) configured to output a plurality of light-receiving element driving signals (D2) which are out of phase relation from each other to said light-receiving element in order to activate said light-receiving element for each of said phase ranges;

a detection signal generation circuit (20) configured to provide to said light-receiving element driving circuit a detection timing signal (D1) for determination of a timing of generating said light-receiving element driving signal; and a timing synchronization circuit (70; 70A; 70B) configured to compare a cyclic variation of the lighting timing signal from said lighting signal generation circuit with a cyclic variation determined by said detection timing signal, and modify at least one of said detection timing signal (D1) and said lighting timing signal (E1) in order to keep a constant phase difference between said cyclic variations, wherein said timing synchronization circuit (70) comprises:

an oscillation circuit (78) configured to use a signal of which frequency varies with an input voltage and provide the signal as said modified detection timing signal (E1$x$) to said light-emitting element driving circuit, and a phase comparator (72) configured to generate a voltage indicative of a phase difference between the cyclic variation (D2) associated with the output from said light-receiving element driving circuit and the lighting timing signal (E1) from said lighting signal generation circuit, and provide said voltage to said oscillation circuit.

* * * * *